United States Patent
Daguin et al.

(12)

(10) Patent No.: US 10,233,936 B2
(45) Date of Patent: Mar. 19, 2019

(54) TURBOCHARGER COMPRESSOR WHEEL ASSEMBLY

(71) Applicant: Garrett Transportation I Inc., Torrance, CA (US)

(72) Inventors: Fréderic Daguin, Epinal (FR); Bernard Remy, Epinal (FR); Jean-Luc Perrin, Girmont (FR); Joel Castan, Chantraine (FR); Dominique Armand, Uxegney (FR)

(73) Assignee: Garrett Transportation I Inc., Torrance, CA (US)

( * ) Notice: Subject to any disclaimer, the term of this patent is extended or adjusted under 35 U.S.C. 154(b) by 363 days.

(21) Appl. No.: 15/081,718

(22) Filed: Mar. 25, 2016

(65) Prior Publication Data

US 2017/0276143 A1 Sep. 28, 2017

(51) Int. Cl.
| | |
|---|---|
| *F04D 29/054* | (2006.01) |
| *F04D 17/10* | (2006.01) |
| *F04D 29/056* | (2006.01) |
| *F04D 29/28* | (2006.01) |
| *F01D 5/02* | (2006.01) |

(Continued)

(52) U.S. Cl.
CPC ............ *F04D 29/054* (2013.01); *F01D 5/025* (2013.01); *F04D 17/10* (2013.01); *F04D 25/024* (2013.01); *F04D 29/056* (2013.01); *F04D 29/0563* (2013.01); *F04D 29/266* (2013.01); *F04D 29/284* (2013.01); *F16B 19/05* (2013.01); *F16D 1/072* (2013.01); *F16D 1/076* (2013.01); *F01D 5/027* (2013.01); *F05D 2220/40* (2013.01)

(58) Field of Classification Search
CPC ...... F04D 29/054; F04D 17/10; F04D 29/284; F04D 29/056; F16B 19/05; F16D 1/076; F16D 1/072; F01D 5/025; F01D 5/027; F05D 2220/40
See application file for complete search history.

(56) References Cited

U.S. PATENT DOCUMENTS

| | | | |
|---|---|---|---|
| 3,091,982 A | 6/1963 | Siebol | |
| 3,993,370 A * | 11/1976 | Woollenweber | F01D 25/166 384/287 |

(Continued)

FOREIGN PATENT DOCUMENTS

| | | |
|---|---|---|
| DE | 10 2009 021725 A1 | 11/2010 |
| GB | 858882 A | 1/1961 |

(Continued)

OTHER PUBLICATIONS

EP Application No. 17156795.1-1610, Extended European Search Report, dated Sep. 19, 2017 (8 pages).

(Continued)

*Primary Examiner* — Eldon T Brockman
(74) *Attorney, Agent, or Firm* — Brian J. Pangrle

(57) ABSTRACT

A compressor wheel assembly of a turbocharger can include a compressor wheel that includes a through bore that extends from a base portion to a nose portion of the compressor wheel; a turbocharger shaft disposed in the through bore of the compressor wheel where the turbocharger shaft includes an end portion that extends axially away from the nose portion of the compressor wheel; and a swaged collar fixed to the end portion of the turbocharger shaft.

18 Claims, 17 Drawing Sheets

(51) Int. Cl.
*F16D 1/072* (2006.01)
*F16D 1/076* (2006.01)
*F16B 19/05* (2006.01)
*F04D 29/26* (2006.01)
*F04D 25/02* (2006.01)

(56) References Cited

U.S. PATENT DOCUMENTS

| | | | |
|---|---|---|---|
| 4,254,809 A | 3/1981 | Schuster | |
| 4,299,519 A | 11/1981 | Corbett | |
| 4,813,834 A | 3/1989 | Smith | |
| 6,516,510 B1 | 2/2003 | Fulbright | |
| 2012/0011969 A1 | 1/2012 | Katou et al. | |
| 2012/0315164 A1* | 12/2012 | Mayernick | F01D 17/165 417/406 |
| 2013/0115088 A1* | 5/2013 | Castan | F04D 29/054 416/204 A |
| 2013/0202382 A1 | 8/2013 | Corebett | |
| 2015/0354444 A1* | 12/2015 | Hayashi | F02B 37/24 415/148 |
| 2016/0167110 A1 | 6/2016 | Hauw | |

FOREIGN PATENT DOCUMENTS

| | | |
|---|---|---|
| WO | 1987000891 A1 | 2/1987 |
| WO | 2001/11248 A1 | 2/2001 |
| WO | 2002/23056 A1 | 3/2002 |
| WO | 2014041328 A1 | 3/2014 |
| WO | 2015033330 A1 | 3/2015 |
| WO | 2015/168063 A1 | 11/2015 |

OTHER PUBLICATIONS

EP Application No. 17156794.4-1610, Extended European Search Report, dated Sep. 19, 2017 (8 pages).
Magni, Magni 565 Fastener Coating Product Data Sheet, Nov. 2015 (1 page).
Alcoa, C50L Huckbolt, 2012 (8 pages).
Alcoa, Huck Bobtail System, 2009 (9 pages).

* cited by examiner

TURBOCHARGER COMPRESSOR WHEEL ASSEMBLY

TECHNICAL FIELD

Subject matter disclosed herein relates generally to compressor wheel assemblies for turbochargers for internal combustion engines.

BACKGROUND

Exhaust driven turbochargers include a rotating group that includes a turbine wheel and a compressor wheel that are connected to one another by a shaft. The shaft is typically rotatably supported within a center housing by one or more bearings (e.g., oil lubricated, air bearings, ball bearings, magnetic bearings, etc.). During operation, exhaust from an internal combustion engine drives a turbochargers turbine wheel, which, in turn, drives the compressor wheel to boost charge air to the internal combustion engine.

BRIEF DESCRIPTION OF THE DRAWINGS

A more complete understanding of the various methods, devices, assemblies, systems, arrangements, etc., described herein, and equivalents thereof, may be had by reference to the following detailed description when taken in conjunction with examples shown in the accompanying drawings where.

DETAILED DESCRIPTION

Below, an example of a turbocharged engine system is described followed by various examples of components, assemblies, methods, etc.

Figure 1:
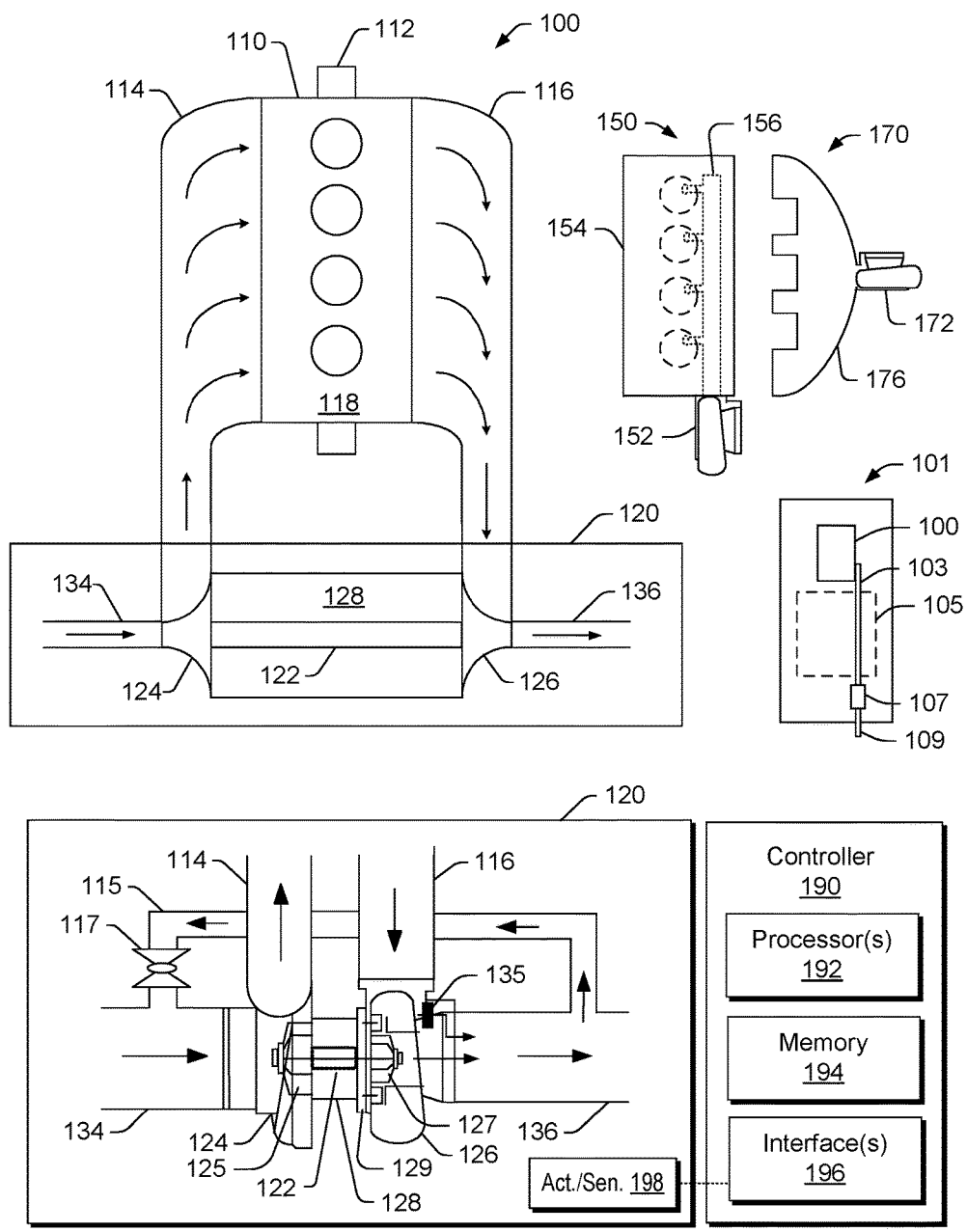
FIG. 1 is a diagram of a turbocharger and an internal combustion engine along with a controller.

Turbochargers are frequently utilized to increase output of an internal combustion engine. Referring to FIG. 1, as an example, a system 100 can include an internal combustion engine 110 and a turbocharger 120. As shown in FIG. 1, the system 100 may be part of a vehicle 101 where the system 100 is disposed in an engine compartment and connected to an exhaust conduit 103 that directs exhaust to an exhaust outlet 109, for example, located behind a passenger compartment 105. In the example of FIG. 1, a treatment unit 107 may be provided to treat exhaust (e.g., to reduce emissions via catalytic conversion of molecules, etc.).

As shown in FIG. 1, the internal combustion engine 110 includes an engine block 118 housing one or more combustion chambers that operatively drive a shaft 112 (e.g., via pistons) as well as an intake port 114 that provides a flow path for air to the engine block 118 and an exhaust port 116 that provides a flow path for exhaust from the engine block 118.

The turbocharger 120 can act to extract energy from the exhaust and to provide energy to intake air, which may be combined with fuel to form combustion gas. As shown in FIG. 1, the turbocharger 120 includes an air inlet 134, a shaft 122, a compressor housing assembly 124 for a compressor wheel 125, a turbine housing assembly 126 for a turbine wheel 127, another housing assembly 128 and an exhaust outlet 136. The housing assembly 128 may be referred to as a center housing assembly as it is disposed between the compressor housing assembly 124 and the turbine housing assembly 126.

In FIG. 1, the shaft 122 may be a shaft assembly that includes a variety of components (e.g., consider a shaft and wheel assembly (SWA) where the turbine wheel 127 is welded to the shaft 122, etc.). As an example, the shaft 122 may be rotatably supported by a bearing system (e.g., journal bearing(s), rolling element bearing(s), etc.) disposed in the housing assembly 128 (e.g., in a bore defined by one or more bore walls) such that rotation of the turbine wheel 127 causes rotation of the compressor wheel 125 (e.g., as rotatably coupled by the shaft 122). As an example a center housing rotating assembly (CHRA) can include the compressor wheel 125, the turbine wheel 127, the shaft 122, the housing assembly 128 and various other components (e.g., a compressor side plate disposed at an axial location between the compressor wheel 125 and the housing assembly 128).

In the example of FIG. 1, a variable geometry assembly 129 is shown as being, in part, disposed between the housing assembly 128 and the housing assembly 126. Such a variable geometry assembly may include vanes or other components to vary geometry of passages that lead to a turbine wheel space in the turbine housing assembly 126. As an example, a variable geometry compressor assembly may be provided.

In the example of FIG. 1, a wastegate valve (or simply wastegate) 135 is positioned proximate to an exhaust inlet of the turbine housing assembly 126. The wastegate valve 135 can be controlled to allow at least some exhaust from the exhaust port 116 to bypass the turbine wheel 127. Various wastegates, wastegate components, etc., may be applied to a conventional fixed nozzle turbine, a fixed-vaned nozzle turbine, a variable nozzle turbine, a twin scroll turbocharger, etc. As an example, a wastegate may be an internal wastegate (e.g., at least partially internal to a turbine housing). As an example, a wastegate may be an external wastegate (e.g., operatively coupled to a conduit in fluid communication with a turbine housing).

In the example of FIG. 1, an exhaust gas recirculation (EGR) conduit 115 is also shown, which may be provided, optionally with one or more valves 117, for example, to allow exhaust to flow to a position upstream the compressor wheel 125.

FIG. 1 also shows an example arrangement 150 for flow of exhaust to an exhaust turbine housing assembly 152 and another example arrangement 170 for flow of exhaust to an exhaust turbine housing assembly 172. In the arrangement 150, a cylinder head 154 includes passages 156 within to direct exhaust from cylinders to the turbine housing assembly 152 while in the arrangement 170, a manifold 176 provides for mounting of the turbine housing assembly 172, for example, without any separate, intermediate length of exhaust piping. In the example arrangements 150 and 170, the turbine housing assemblies 152 and 172 may be configured for use with a wastegate, variable geometry assembly, etc.

In FIG. 1, an example of a controller 190 is shown as including one or more processors 192, memory 194 and one or more interfaces 196. Such a controller may include circuitry such as circuitry of an engine control unit (ECU). As described herein, various methods or techniques may optionally be implemented in conjunction with a controller, for example, through control logic. Control logic may depend on one or more engine operating conditions (e.g., turbo rpm, engine rpm, temperature, load, lubricant, cooling, etc.). For example, sensors may transmit information to the controller 190 via the one or more interfaces 196. Control logic may rely on such information and, in turn, the controller 190 may output control signals to control engine operation. The controller 190 may be configured to control lubricant flow, temperature, a variable geometry assembly (e.g., variable geometry compressor or turbine), a wastegate (e.g., via an actuator), an electric motor, or one or more other components associated with an engine, a turbocharger (or turbochargers), etc. As an example, the turbocharger 120 may include one or more actuators and/or one or more sensors 198 that may be, for example, coupled to an interface or interfaces 196 of the controller 190. As an example, the wastegate 135 may be controlled by a controller that includes an actuator responsive to an electrical signal, a pressure signal, etc. As an example, an actuator for a wastegate may be a mechanical actuator, for example, that may operate without a need for electrical power (e.g., consider a mechanical actuator configured to respond to a pressure signal supplied via a conduit).

Figure 2:
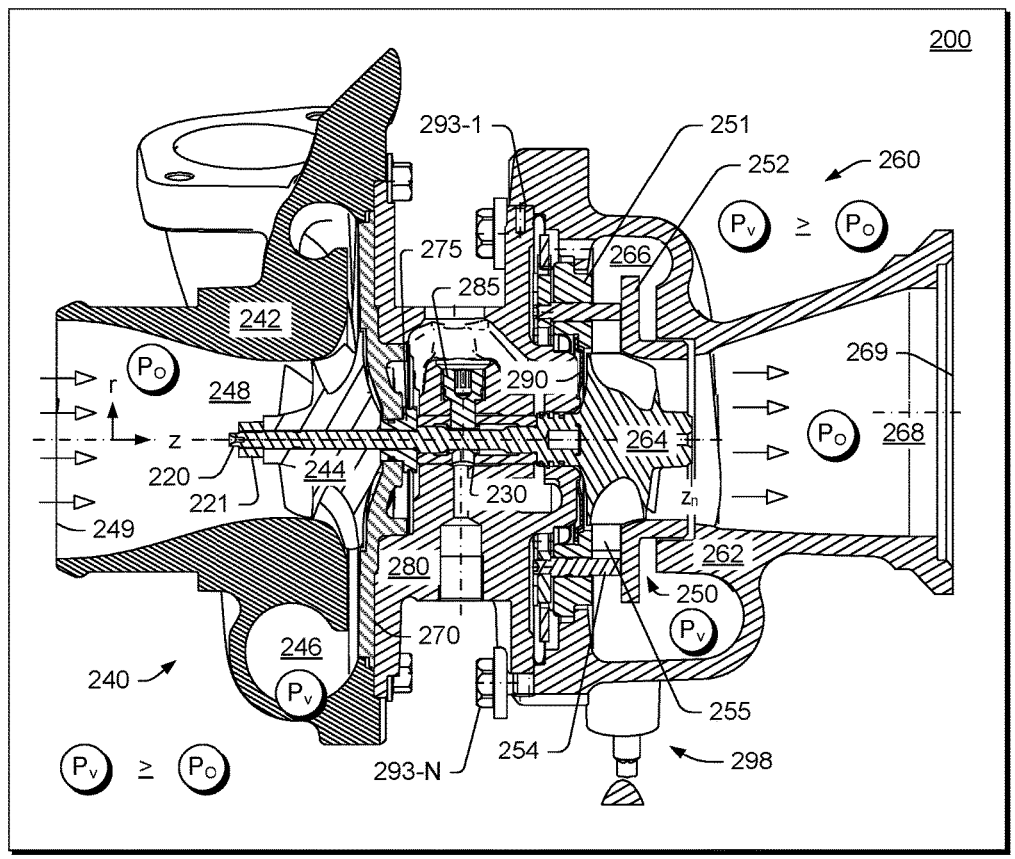
FIG. 2 is a cutaway view of an example of a turbocharger assembly.

FIG. 2 shows an example of a turbocharger assembly 200 that includes a shaft 220 supported by a bearing 230 (e.g., a journal bearing, a bearing assembly such as a rolling element bearing with an outer race, etc.) disposed in a bore (e.g., a through bore defined by one or more bore walls) of a housing 280 between a compressor assembly 240 and a turbine assembly 260. The compressor assembly 240 includes a compressor housing 242 that defines a volute 246 and that houses a compressor wheel 244. As shown in FIG. 2, the turbine assembly 260 includes a turbine housing 262 that defines a volute 266 and that houses a turbine wheel 264. The turbine wheel 264 may be, for example, welded or otherwise attached to the shaft 220 to form a shaft and wheel assembly (SWA) where a free end of the shaft 220 allows for attachment of the compressor wheel 244.

As to air flow, air can be directed to the volute 246 via a diffuser section defined in part by the compressor housing 242 and a backplate 270 as the compressor wheel 244 rotates, drawing air into a passage 248 via an inlet 249, both of which may be defined by the compressor housing 242. As indicated in FIG. 2, during operation of the turbocharger 200, the compressor wheel 244 acts to boost air pressure such that air pressure in the volute 246 ($P_V$) is greater than air pressure in the passage 248 ($P_O$). As an example, where exhaust gas recirculation (EGR) is implemented, environmental air may be mixed with exhaust (e.g., upstream and/or downstream of the compressor wheel 244).

In the example of FIG. 2, an axial locating pin 285 is received in an opening of the bearing 230, which may be a cross-bore of the bearing 230. As an example, where the bearing 230 is a rolling element bearing with an outer race, the outer race can include an opening. As an example, one or more other types of axial locating mechanisms may be included in a turbocharger that act to limit axial movement of a bearing (e.g., and/or movement in one or more other directions).

In the example of FIG. 2, the shaft 220 includes a step (e.g., a shoulder) that forms an axial annular face. In the example of FIG. 2, a thrust collar 275 includes a surface that is seated against the axial annular face of the shaft 220. In such an example, a lock nut 221 can include threads that match threads of an end portion of the shaft 220 such that tightening of the lock nut 221 with respect to the shaft 220 loads the compressor wheel 244 and the thrust collar 275 against the axial annular face of the shaft 220, which can place the shaft 220 (e.g., from the step to its end portion) in tension. In such an example, the shaft 220, the compressor wheel 244 and the lock nut 221 can rotate as a unit (e.g., responsive to exhaust driving the turbine wheel 264). As shown in the example of FIG. 2, the backplate 270 can include a bore in which at least a portion of the thrust collar 275 is positioned where the thrust collar 275 can include a groove or grooves that may seat a seal element or seal elements (e.g., O-rings, piston rings, etc.).

The turbine assembly 260 further includes a variable geometry assembly 250, which may be referred to as a "cartridge" (e.g., the cartridge 250), that may be positioned using an annular component or flange 251 (e.g., optionally shaped as a stepped annular disc) of the cartridge 250 that clamps between the housing 280 and the turbine housing 262, for example, using bolts 293-1 to 293-N and a heat shield 290 (e.g., optionally shaped as a stepped annular disc), the latter of which is disposed between the cartridge 250 and the housing 280. As shown in the example of FIG. 2, the cartridge 250 includes a shroud component 252 and the annular component 251. As an example, one or more mounts or spacers 254 may be disposed between the shroud component 252 and the annular component 251, for example, to axially space the shroud component 252 and the annular component 251 (e.g., forming a nozzle space).

As an example, vanes 255 may be positioned between the shroud component 252 and the annular component 251, for example, where a control mechanism may cause pivoting of the vanes 255. As an example, the vane 255 may include a vane post that extends axially to operatively couple to a control mechanism, for example, for pivoting of the vane 255 about a pivot axis defined by the vane post.

As to exhaust flow, higher pressure exhaust in the volute 266 passes through passages (e.g., a nozzle or nozzles, a throat or throats, etc.) of the cartridge 250 to reach the turbine wheel 264 as disposed in a turbine wheel space defined by the cartridge 250 and the turbine housing 262. After passing through the turbine wheel space, exhaust travels axially outwardly along a passage 268 defined by a wall of the turbine housing 262 that also defines an opening 269 (e.g., an exhaust outlet). As indicated, during operation of the turbocharger 200, exhaust pressure in the volute 266 ($P_V$) is greater than exhaust pressure in the passage 268 ($P_O$).

As an example, wheel, whether a turbine wheel or a compressor wheel, can include an inducer portion and an exducer portion, for example, characterized in part by an inducer radius ($r_i$) and an exducer radius ($r_e$). As an example, an individual blade can include an inducer edge (e.g., a leading edge) and an exducer edge (e.g., a trailing edge). A wheel may be defined in part by a trim value that characterizes a relationship between inducer and exducer portions.

Figure 3:
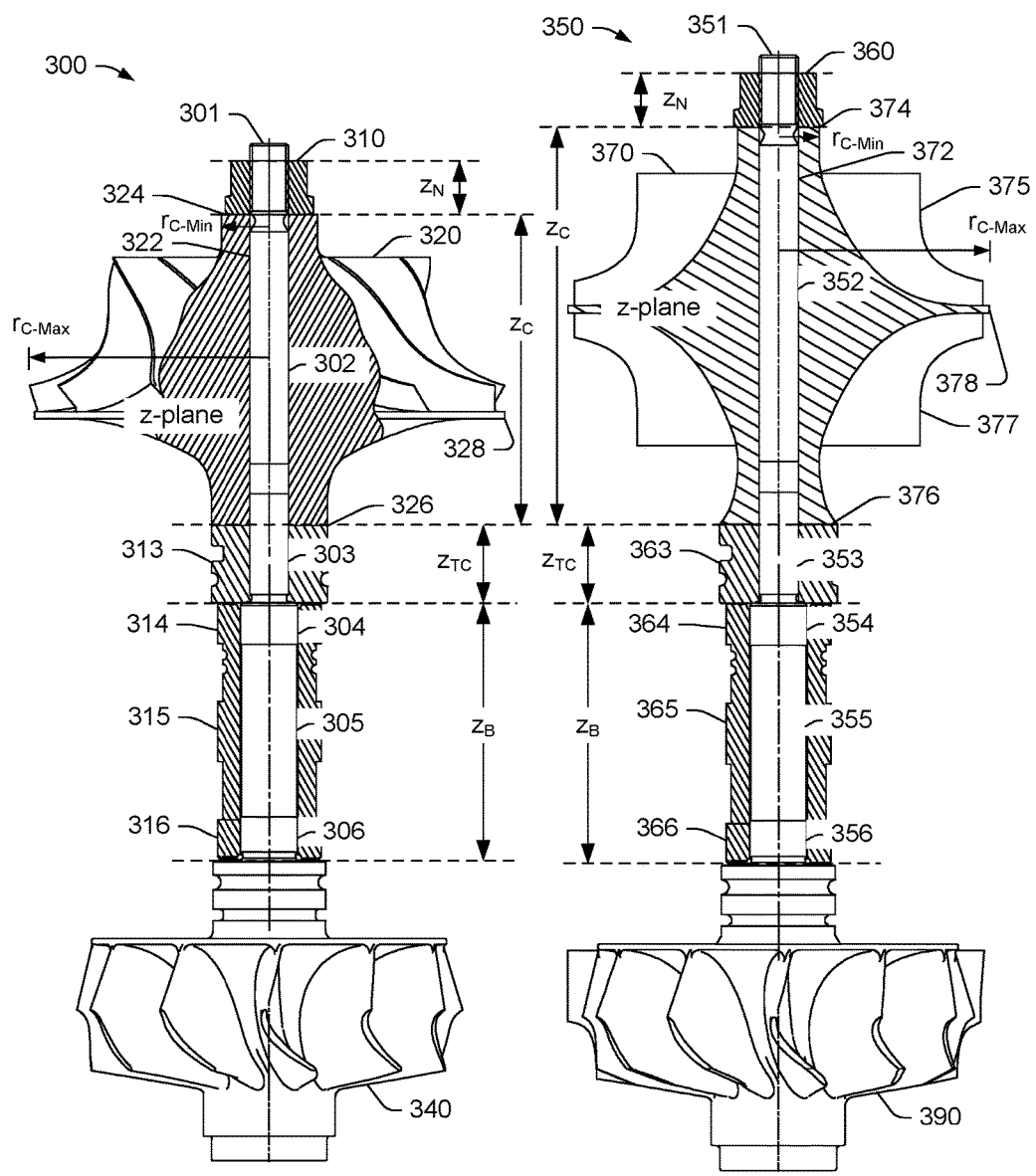
FIG. 3 is a diagram of two examples of compressor wheel assemblies.

FIG. 3 shows examples of two assemblies 300 and 350 where each of the assemblies includes a compressor wheel 320 or 370 having a through bore 322 or 372 and a lock nut 310 or 360 fixed to a shaft 301 or 351 that extends through the through bore 322 or 372. As shown, the compressor wheel 370 includes two impeller faces 375 and 377 (e.g., outwardly and inwardly facing) while the compressor wheel 320 includes only a single impeller face (e.g., outwardly facing; noting that a single impeller face may be inwardly facing).

In the examples of FIG. 3, each of the shafts 301 and 351 extends from a respective turbine wheel 340 and 390. Disposed axially along each of the shafts 301 and 351 are respective thrust collars 313 and 363 and respective bearings 315 and 365. The shaft 301 includes a compressor wheel portion 302, a thrust collar portion 303, a compressor journal bearing portion 304, a bearing portion 305, and a turbine journal bearing portion 306. The shaft 351 also includes a compressor wheel portion 352, a thrust collar portion 353, a compressor journal bearing portion 354, a bearing portion 355, and a turbine journal bearing portion 356. Various axial dimensions are shown for the bearings 315 and 365 ($z_B$), the thrust collars 313 and 363 ($z_B$), the compressor wheels 320 and 370 ($z_C$), and the lock nuts 310 and 360 ($z_N$).

For the assembly 300, the compressor wheel 320 includes a nose end 324 that abuts the lock nut 310 and a base end 326 that abuts the thrust collar 313. The compressor wheel 320 has a minimum radius $r_{C-Min}$ at its nose end 324 and has a maximum wheel radius $r_{C-Max}$ at an edge 328 that coincides with a so-called z-plane.

For the assembly 350, the compressor wheel 370 includes a nose end 374 that abuts the lock nut 360 and a base end 376 that abuts the thrust collar 363. The compressor wheel 370 has a minimum radius $r_{C-Min}$ at its nose end 374 and has a maximum wheel radius $r_{C-Max}$ at an edge 378 that coincides with a so-called z-plane.

In the assemblies 300 and 350, the respective shafts 301 and 351 each include a shoulder (e.g., a step) that is located at a transition between the bearing and the thrust collar portions. As shown, the thrust collar 313 can seat against the shoulder of the shaft 301 and the thrust collar 363 can seat against the shoulder of the shaft 351. As an example, a shaft shoulder can include an annular surface that can be in contact with an annular surface of a thrust collar. As an example, a thrust collar can include an annular surface that contacts a base end of a compressor wheel. As an example, a thrust collar can be "clamped" (e.g., via tightening of a lock nut) in an axial location that is between a surface of a shaft and a surface of a compressor wheel such that the compressor wheel, the thrust collar and the shaft rotate as a unit. In such an example, a bearing may be positioned with an axial clearance between the thrust collar and an end of the bearing and the bearing may be positioned with an axial clearance between a surface of a turbine wheel and an opposing end of the bearing. As mentioned, a bearing may be axially located where axial movement of the bearing is limited.

With respect to balancing, as an example, a lock nut may be made of steel and be suitable for measuring unbalance through magnetic field sensing. During a balancing process, one or more cuts may be made in a lock nut according to information provided by a balancing machine (e.g., a VSR).

Figure 4:
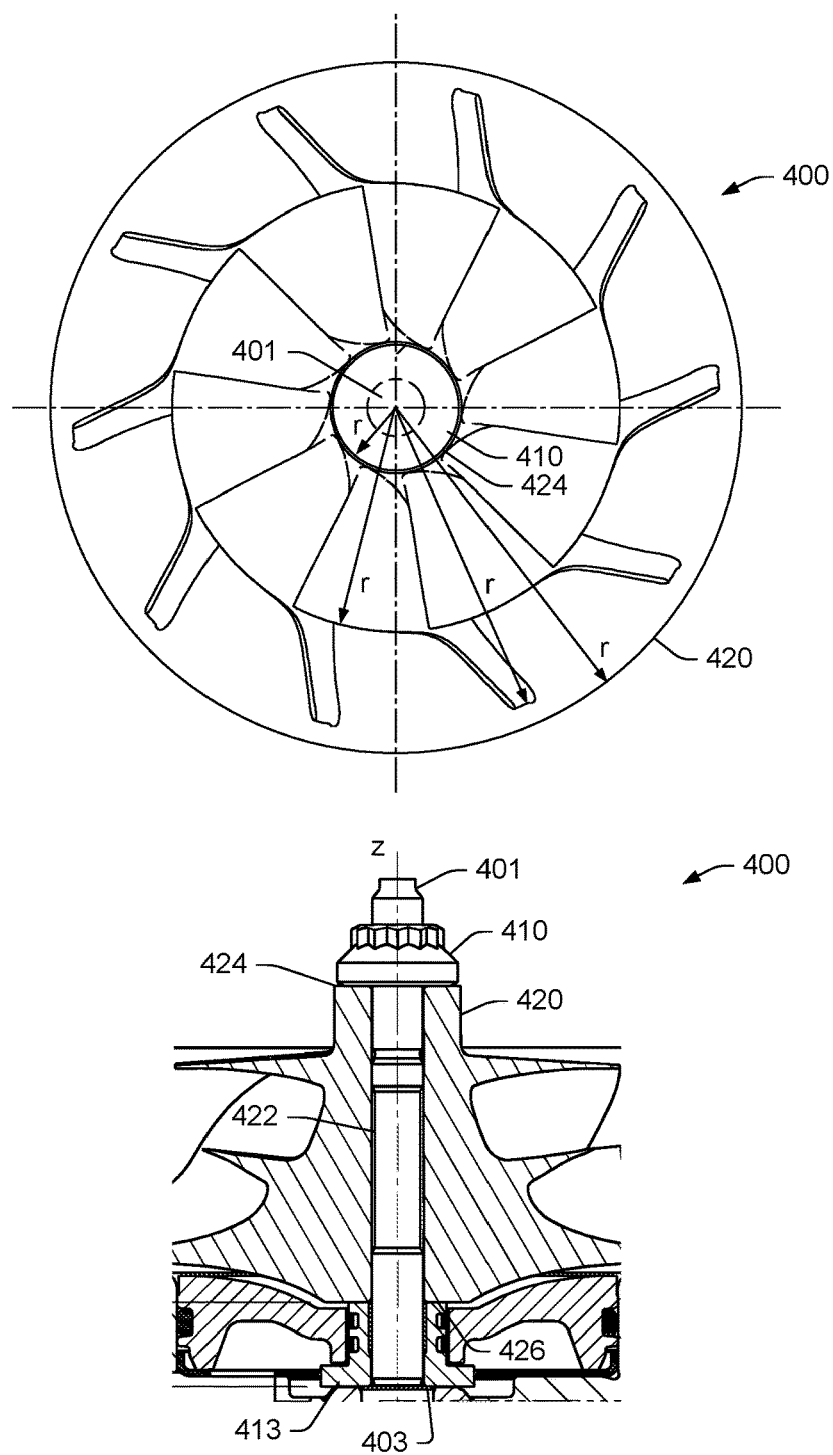
FIG. 4 is a diagram of an example of a compressor wheel assembly.

FIG. 4 shows an example of an assembly 400 that includes a shaft 401, a lock nut 410, a thrust collar 413, and a compressor wheel 420 where the shaft 401 extends through a bore 422 of the compressor wheel 420, where the lock nut 410 abuts a nose end 424 of the compressor wheel 420 and where the thrust collar 413 abuts a base end 426 of the compressor wheel 420. In such an example, the lock nut 410 can include internal threads that mate with external threads of the shaft 401 such that the lock nut 410 can contact the nose end 424 of the compressor wheel 420 to retain the compressor wheel 420 on the shaft 401. For example, the lock nut 410 can be rotated such that matching spiral threads cause the lock nut 410 to translate axially responsive to rotation.

As an example, an assembly process can be referred to as clamping. For example, the lock nut 410 can clamp the compressor wheel 420 in a manner where the compressor wheel 420 is under compression and where the shaft 401 is under tension. In the example of FIG. 4, the thrust collar 413 can be seated against a surface 403 of the shaft 401 (e.g., a shoulder) such that tightening of the lock nut 410 acts to apply compressive force on the compressor wheel 420 and the thrust collar 413. In such an example, the shaft 401 can be at least in part under tension (e.g., from an axial position of the surface 403 to an axial position of the lock nut 410). As an example, during operation, thermal energy and kinetic energy can cause changes in forces.

Various material properties can characterize how an assembly may respond to thermal energy, rotation, compression, tension, etc. For example, thermal coefficients can determine how much a material expands or contracts in response to a change in temperature. As another example, the Poisson ratio can characterize dimensional changes that can occur in response to compression or tension.

The Poisson ratio is a negative ratio of transverse to axial strain. For example, where a material is compressed in one direction of a three-dimensional coordinate system, it can expand in other directions (e.g., perpendicular to a direction of compression), a phenomenon referred to as the Poisson effect. The Poisson ratio is a fraction (or percent) of expansion divided by a fraction (or percent) of compression, for small values of these changes. Conversely, if a material is stretched rather than compressed, it can contract in one or more directions transverse to a direction of stretching (e.g., an effect that may also be referred to as the Poisson effect). In such a scenario, the Poisson ratio is the ratio of relative contraction to relative expansion. In certain cases, a material may shrink in a transverse direction when compressed (or expand when stretched) which will yield a negative value of the Poisson ratio.

In the example of FIG. 4, the assembly 400 corresponds to a process used for through bore compressor wheel clamping where the lock nut 410 is tightened on a threaded shaft 401. Such a process can generate a substantial amount of variability in clamping load and can be accompanied by a substantial amount of unbalance. Variability in clamping load leads to min and max specifications for the tightening that can constrain design and performance. Unbalance attributed to clamping can originate from a lock nut itself, for example, as not being centered on a shaft (e.g., where threads do not locate radially) and, for example, from tightening, which can generate torsion and bending of a shaft.

As an example, an assembly can include a swaged collar on a shaft where such a swaged collar can be fit to the shaft in a manner that intends to diminish (e.g., even avoid) torsion and bending of the shaft and, for example, in a manner that can directly control clamping load.

Figure 5:
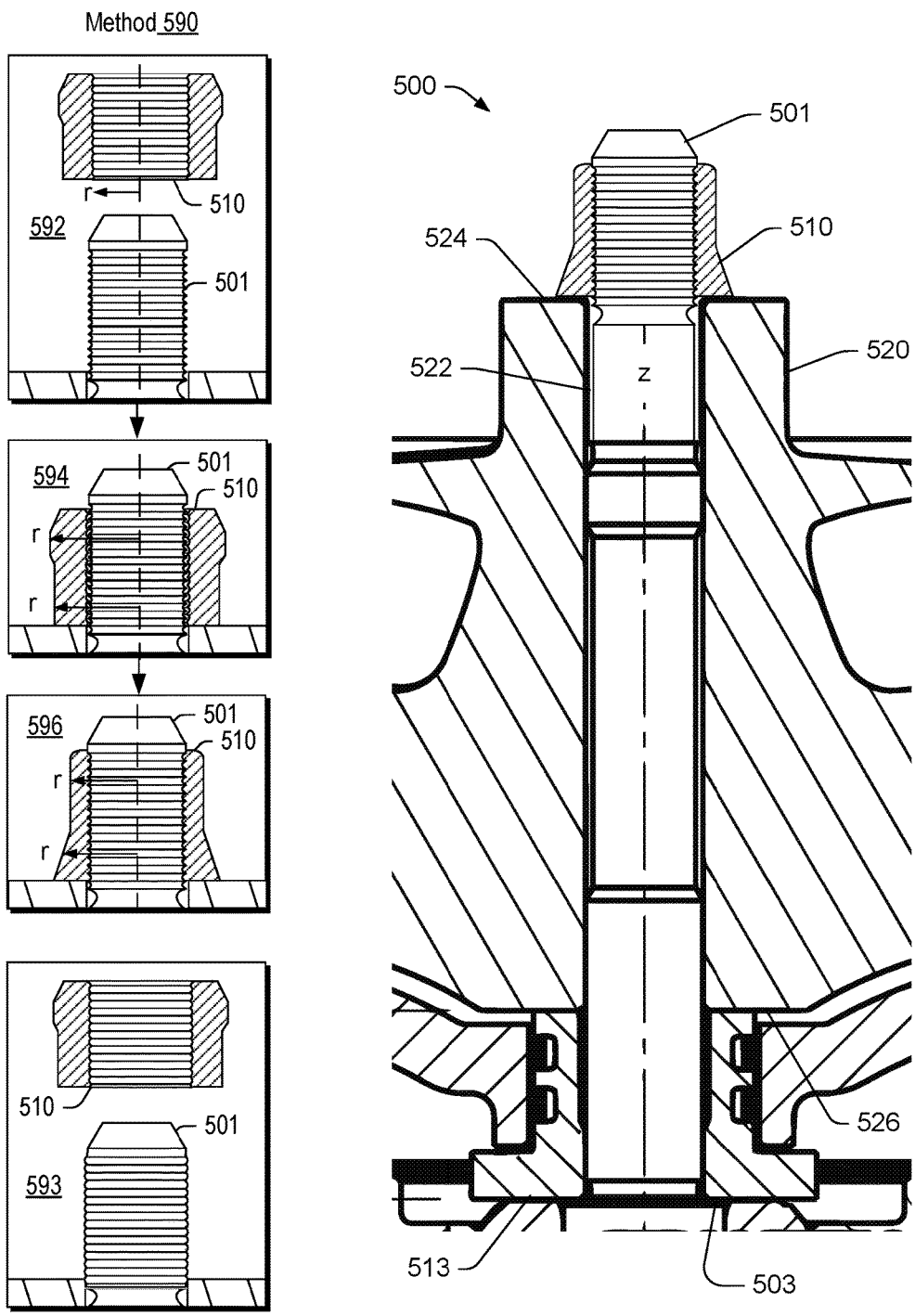
FIG. 5 is a diagram of an example of a compressor wheel assembly.

FIG. 5 shows an example of an assembly 500 that includes a shaft 501, a swaged collar 510, a thrust collar 513, and a compressor wheel 520 where the shaft 501 extends through a bore 522 of the compressor wheel 520, where the swaged collar 510 abuts a nose end 524 of the compressor wheel 520 and where the thrust collar 513 abuts a base end 526 of the compressor wheel 520. In such an example, the swage collar 510 can contact the nose end 524 of the compressor wheel 520 to retain the compressor wheel 520 on the shaft 501. For example, as explained, a shaft can include a surface that bears force. In the example of FIG. 5, the shaft 501 includes a surface 503 (e.g., an axial face, etc.) that is in contact with the thrust collar 513, which is in contact with the base end 526 of the compressor wheel 520.

FIG. 5 also shows a series of diagrams of an example of a method 590 that includes a provision block 592 for providing the swage collar 510 (e.g., in an undeformed state) along with a shaft 501 as part of an assembly such as a center housing rotating assembly (CHRA), a position block 594 for positioning the swage collar 510 with respect to the shaft 501 (e.g., to align axes thereof), and a fixation block 596 where the swage collar 510 has been deformed to be a swaged collar 510 that is fixed to the shaft 501 to "lock-in" a desired load (e.g., axially between the swaged collar 510 and the surface 503 of the shaft 501).

As shown in the example of FIG. 5, the radial dimensions of the swage collar 510 change. For example, a swage collar can include a radial or cross-sectional profile that changes responsive to force that deforms the collar. As shown in the example of FIG. 5, the collar 510 can include a larger radius over an upper half and a smaller radius over a lower half where deformation can result in a smaller radius over an upper half and a larger radius over a lower half where the lower half includes a lower surface that can be, for example, in contact with a nose of a compressor wheel. As an example, a bore diameter of a collar can change responsive to application of force where the bore diameter becomes smaller over at least one axial portion of the bore. As an example, a shaft can deform a small amount due to an applied load, for example, a shaft may stretch, where stretching may be accompanied by a corresponding Poisson effect.

As an example, a swage collar can include grooves and a shaft can include ridges. As an example, grooves may be annular grooves and ridges may be annular ridges. As an example, grooves may be adjacent one another and ridges may be adjacent one another. As an example, grooves may be axially spaced and ridges may be axially spaced. As an example, grooves of a swage collar in an undeformed stated can be of a larger diameter than ridges of a shaft such that the swage collar can be positioned with respect to the shaft. In such an example, a swaging process can deform the swage collar to be a swaged collar where the diameter of the grooves becomes smaller such that contact is made between the swaged collar and the shaft. In such an example, contact between surfaces along an axial length of features (e.g., grooves and ridges) may be greater than about 40 percent.

As an example, grooves and ridges may be of one or more shapes. For example, consider shapes as in the block 592 or shapes as in a block 593 (e.g., where the ridges are more rounded than in the block 592).

As shown in FIG. 5, the swaged collar 510 can contact the compressor wheel 520 at a nose end 524 such that a load is carried by the swaged collar 510 where the load is transferred to the shaft 501. During operation of a turbocharger, the shaft 501, the swaged collar 510 and the compressor wheel 520 can rotate as a unit where, for example, contact between the swaged collar 510 and the compressor wheel 520 can reduce slippage of the compressor wheel 520 about the shaft 501; noting that an outer surface or outer surfaces of the shaft 501 may also contact a surface or surfaces of the through bore 522 of the compressor wheel 520 where such contact may also reduce slippage. Further, contact can exist between the compressor wheel 520 and the thrust collar 513 and the thrust collar 513 and the surface 503 of the shaft 501.

As an example, an assembly process can be referred to as clamping. For example, the swage collar 510 can clamp the compressor wheel 520 in a manner where the compressor wheel 520 is under compression and where the shaft 501 is under tension.

In the example of FIG. 5, the assembly 500 corresponds to a process used for through bore compressor wheel clamping where the swage collar 510 is fit via swaging (e.g., crimping). Such a process may be performed in a manner that can reduce assembly-to-assembly variability in clamping load (e.g., when compared to a process associated with the assembly 400 of FIG. 4) and in a manner that can reduce amount of unbalance (e.g., when compared to a process associated with the assembly 400 of FIG. 4).

As an example, swaging can be achieved without applying any substantial amount of torsion (e.g., no torque and no friction) to a shaft and without applying any substantial amount of bending to a shaft. In such an example, a clamping process can be performed with reduced risk of generating unbalance (e.g., consider unbalance due to bending, etc.).

As an example, a swaging tool can be used to swage a collar where the tool holds a shaft at an extremity of the shaft while pushing a compressor wheel through the collar such that there is direct control of clamping load applied where, for example, the tool enables direct measurement of the force with an integrated load cell, etc. As an example, functional specifications for a compressor wheel clamping process can be in terms of load. As an example, a process can include one or more sensors for one or more measurements (e.g., load, torque, angle, shaft stretch, etc.) where such one or more measurements may be utilized to reduce variability in clamping load applied, etc. and enhance quality (e.g., adherence to desired specification(s), etc.).

As an example, equipment for swaging can be of various types of construction. As an example, a collar suitable for swaging can include various different types of features. As an example, a collar may or may not include threads.

As an example, a threadless collar may be utilized in a process that includes swaging. As an example, a collar suitable for use in a process that includes swaging can include grooves or threads with one or more types of shapes.

As an example, an extremity of a shaft can include one or more features that allow for pulling of the shaft. For example, consider an extremity with a groove or threads, which may be internal and/or external.

As an example, a swage collar can be placed on a shaft in contact with a compressor wheel and a swage tool can pull the shaft while pushing the compressor wheel to deform the swage collar. In such an example, the swage tool deforms the collar as the force increases, swaging it on the shaft (e.g., via a groove, threads, etc. of the shaft). As an example, a swage tool can control clamping load, for example, a swage tool may disengage a load when a desired load is reached.

As an example, a compressor clamping process can achieve a sufficient clamping load such that torque from turbine to compressor is sufficiently transferred (e.g., via the rotor assembly). A process can control clamping load and, for example, one or more other parameters, such that a desired balance is achieved between power loss and unbalance migration reduction, manufacturability and cost reduction, for example, to help assure sufficient robustness.

As an example, dimensions may be tailored (e.g., minimized) to reduce one or more types of losses; however, dimensions can be sufficiently large to make transmission of torque robust and to maintain an assembly in a yielding zone that helps to assure minimal compressor wheel displacement and unbalance migration, for example, after severe thermal and kinetic running conditions.

As an example, an assembly can be designed with a minimal number of parts, which can include parts that are fully cylindrical, for example, to help to reduce component unbalance, and that can be accurately fitted to help to reduce assembly unbalance.

As an example, a cylindrical, precisely machined socket may be utilized as a collar to be swaged, for example, to be included in an assembly where the collar replaces a serial lock nut, which can introduce imprecision during assembling (e.g., due to poor thread positioning versus rotation axis, etc.). As an example, such a socket may allow for controlled clamping load and potential remaining unbalance correction.

As an example, a feature can be machined in a tip of a shaft, for example, to allow accurate load traction during a compressor wheel assembling process (e.g., consider one or more of a neck, internal threads, external threads, etc.).

As an example, a method can include controlling force and/or controlling load. For example, a method can include deforming a collar (e.g., a swage collar), which may be a single or a multi-piece collar, to "lock-in" a desired amount of load (e.g., loading). As an example, a method that includes a nut with internal threads that is threaded to external threads of a turbocharger shaft to "lock-in" a desired amount of load (e.g., loading) can be controlled via measurement of stretch (e.g., distance), which can be due to elongation of a shaft. For example, the nut-based approach can estimate or infer a desired load via an amount of elongation (e.g., stretch), which may be a distance in a range of tens of microns (e.g., 20 microns to about 80 microns, etc.). In such an example, variations in elongation from assembly to assembly may not necessarily assure a desired amount of load. Further, measurement of elongation may be of lesser accuracy than, for example, direct measurement of load (e.g., force).

As an example, in a force range of about 3000 N to about 6000N (e.g., consider a compressor wheel with a diameter of about 30 mm to about 60 mm), elongation or stretch may be about 20 microns to about 80 microns. Control of stretch and/or variation thereof may be, for example, plus or minus about 7 microns to about 10 microns; whereas, control of force (e.g., load) can be lower than about 200 N. Thus, a method that includes force or load control may output assemblies that are more accurately specified with respect to loading when compared to a method that includes control based on measurement of distance (e.g., elongation or stretch).

As an example, a substantially fully cylindrical crimping system may be implemented to apply a desired clamping load where a collar (e.g., a socket) is crimped in accurate manner, to help assure that a load is applied in a relatively permanent manner.

As an example, swaging may be utilized as part of a more stringent and accurate compressor wheel assembling process that can provide robustness as to vehicle conditions, control and reduction of assembling unbalance of a center housing rotating assembly (CHRA), etc.

As an example, a process can utilize a cylindrical part as a collar. As an example, a process can help to assure increased alignment of locking/clamping component, stub shaft (e.g., and potentially compressor wheel and thrust spacer) with respect to a shaft's rotation axis. As an example, a process may be a simplified process in one or more aspects and may provide for more accurate compressor wheel tightening as well as diminishing torque and angle or/and stretch issues.

As an example, a process can include one or more fully circular, cylindrical and accurately shaped components, for example, without radial thread positioning design issues (e.g., to enhance unbalance control). As an example, a process can be a tightening process that may be implemented without torsion during assembling (e.g., noting that torsion can impact balance control). As an example, an assembly process can apply load without applying a substantial amount of one or more of torque, angle or stretch, for example, depending on variable material proprieties, friction coefficient, etc. As an example, a process can improve CHRA balancing rolled throughput yield (RTY).

As an example, a swage collar as swaged to a shaft can include an amount of material that is sufficient for purposes of material removal for balancing. As an example, a compressor wheel can include a nose portion where a swaged collar is adjacent to the nose portion and where one or more of the nose portion and the swaged collar can be utilized for balancing via material removal. As an example, an assembly can include a compressor wheel that includes a nose portion where balancing is achieved via material removal from the nose portion rather than, for example, material removal from a swaged collar that clamps the compressor wheel to a shaft. As an example, a swage collar, a shaft, a thrust collar and a compressor wheel can be made of metallic material, for example, consider one or more metals and/or one or more alloys.

Figure 6:
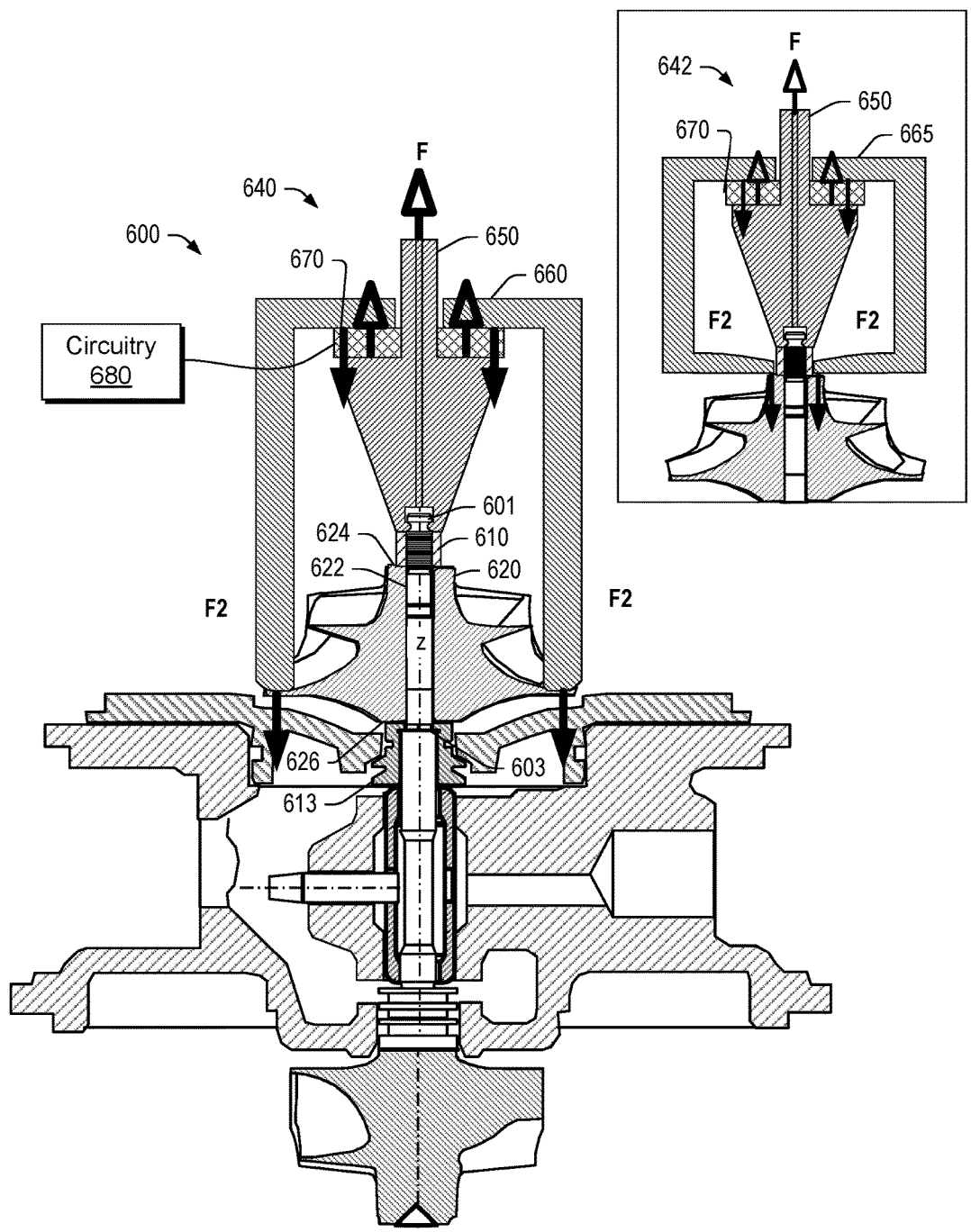
FIG. 6 is a diagram of examples of assemblies.

FIG. 6 shows an example of an assembly 600 that includes a force applicator such as, for example, a force applicator 640, a force applicator 642, etc. In the example of FIG. 6, the assembly 600 includes a center housing rotating assembly (CHRA) that includes a shaft 601, a collar 610, a thrust collar 613, and a compressor wheel 620 where the shaft 601 extends through a bore 622 of the compressor wheel 620, where the collar 610 abuts a nose end 624 of the compressor wheel 620, where the thrust collar 613 abuts a base end 626 of the compressor wheel 620 and where the thrust collar 613 abuts a surface 603 of the shaft 601. In the example of FIG. 6, the thrust collar 613 includes an interior surface that abuts the surface 603 of the shaft 601. In such an example, the surface 603 of the shaft 601 may be closer to the base end 626 of the compressor wheel 620 and, for example, alignment (e.g., planar alignment) may be less impacted by volume of material of the thrust collar 613 (e.g., such an arrangement can reduce the amount of thrust collar material between a load bearing surface of a shaft and a base end of a compressor wheel).

In the example of FIG. 6, force F and force F2 are illustrated as may be considered in a clamping process that implements a force applicator such as the force applicator 640 or the force applicator 642, to achieve a desired state of the CHRA. As an example, the force F can be a load or clamping force that can be "locked-in" via deformation of the collar 610. As an example, a force diagram can include forces illustrated with respect to a thrust collar where present. For example, force arrows may be illustrated with respect to the thrust collar 613 and the compressor wheel 620 and/or with respect to the thrust collar 613 and the surface 603 of the shaft 601.

In the example of FIG. 6, the force applicator 640 includes a puller 650 that can clamp an end portion of the shaft 601 and, for example, one or more members 660 that can contact the compressor wheel 620. For example, the one or more members 660 may be a cylindrical member, a multi-prong member, etc. The one or more members 660 can include a flat and/or a contoured surface or surfaces that can seat against one or more surfaces of the compressor wheel 620.

In the examples of FIG. 6, the force applicator 642 includes a puller 650 that can clamp an end portion of the shaft 601 and, for example, one or more members 665 that can contact the compressor wheel 620. For example, the one or more members 665 may be a cylindrical member, a multi-prong member, etc. The one or more members 660 can include a flat and/or a contoured surface or surfaces that can seat against, for example, a nose surface of the compressor wheel 620.

In the examples of FIG. 6, the force applicator 640 and the force applicator 642 can include a load cell 670, which may be operatively coupled to circuitry 680, for example, to control an assembly process that can include crimping (e.g., swaging).

As an example, an assembly can include a crimper that can crimp (e.g., swage) a collar onto a shaft. As an example, the one or more members 665 may be adjustable to apply a crimping force to the collar 610 to deform the collar 610 (e.g., forming a deformed collar) to fix the collar 610 to the shaft 601.

As an example, a collar can include one or more grooves along at least a portion of a surface of a bore of the collar. As an example, grooves may be annular grooves that are defined by an axial dimension and a radial depth from a bore radius. As an example, grooves may be spaced axially and separate (e.g., in contrast to a spiral thread). As an example, a shaft can include ridges that may be annular ridges that are defined by an axial dimension and a radial ridge height from a shaft surface radius. As an example, ridges may be spaced axially and separate (e.g., in contrast to a spiral thread). As an example, a crimper can deform a collar such that contact between grooves and ridges occurs where, for example, such contact maybe more intimate than contact between surfaces of a threaded collar and a threaded shaft. Where contact is increased, the collar and the shaft may be less prone to vibration and/or other phenomena that may cause loosening and/or movement.

As an example, compressor wheel nose compression, in an assembly process that includes swaging, may be specified according to a minimum load, for example, of about 3500 N or more with a load variability of about 5 percent to about 20 percent. For example, consider a minimum load of about 3000 N and a maximum load of about 4000 N. As an example, depending on dimensions, stretching of a shaft may be in a range of about 55 microns to about 65 microns. As an example, a seating surface (e.g., force application surface, etc.) may be about 10 square millimeters to about 30 square millimeters. For example, consider a seating surface of about 20 square millimeters for a diameter of about 9 millimeters at a nose portion of a compressor wheel.

As an example, as to compressor wheel hub compression, a process can include compressing a compressor wheel during load relaxation. As an example, consider a minimum load after relaxation of about 3500 N, with, for example, a relaxation of about 25 microns (e.g., based on stretch). In such an example, where load variability may be about 5 percent to about 10 percent, minimum and maximum forces can be determined along with estimates of stretch at contact and final stretch. In turn, a seating surface area may be determined.

As an example, a process can include determining a load precision and determining a shape and/or size of a counter load surface. As an example, a process can include determining a load precision and determining how to position a force applicator to not generate added stress. In such examples, calculations can be utilized to determine how much to grip during an assembly process.

FIGS. 7A, 7B, 7C and 7D show a series of approximate diagrams as to an assembly method that includes swaging. In FIGS. 7A, 7B, 7C and 7D, a shaft 700 includes a turbocharger shaft portion 701 with a surface 703 and an assembly grip portion 705. As shown, the turbocharger shaft portion 701 extends through a bore 722 of a compressor wheel 720 that includes a nose end 724 and a base or hub end 726. At the base end 726, a thrust collar 713 is illustrated as abutting the surface 703 while at the nose end 724, a swage collar 710 is swaged to become a swaged collar 710 that applies a compressive load to the compressor wheel 720 and a tensile load to the turbocharger shaft portion 701 of the shaft 700 where the assembly grip portion 705 of the shaft 700 is detached.

Figure 7A:
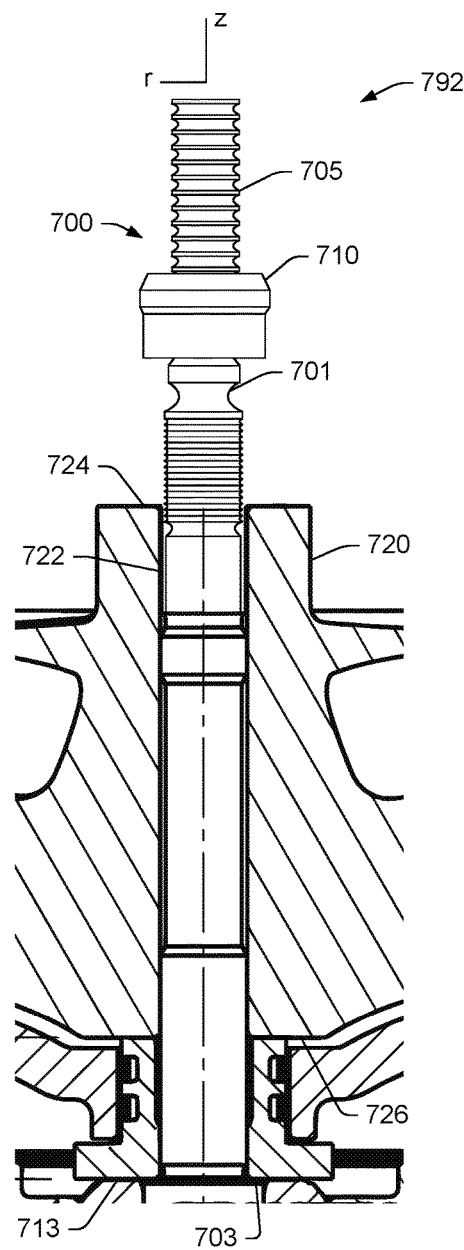
FIGS. 7A, 7B, 7C and 7D are diagrams of an example of a compressor wheel assembly with respect to an assembly process.
Figure 7B:
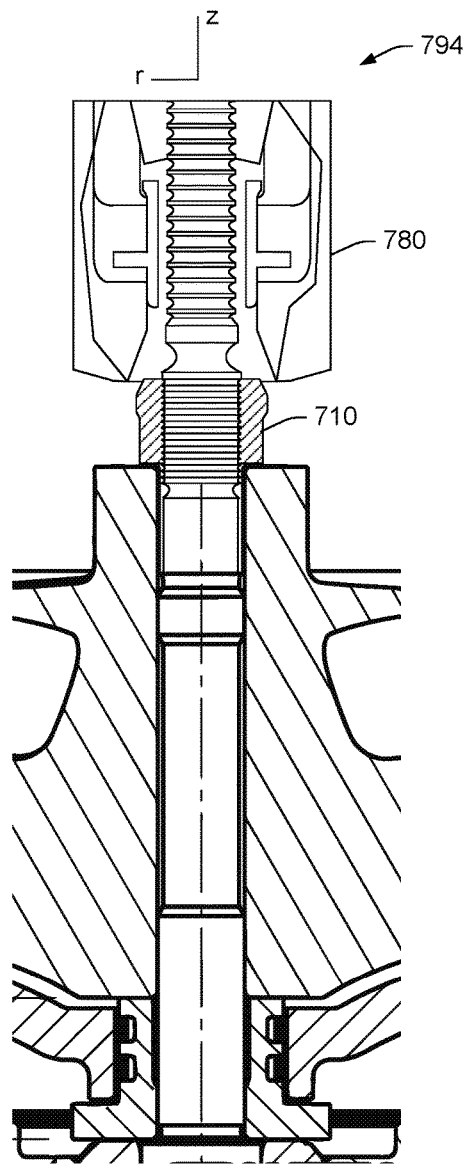
Figures 7C, 7D:
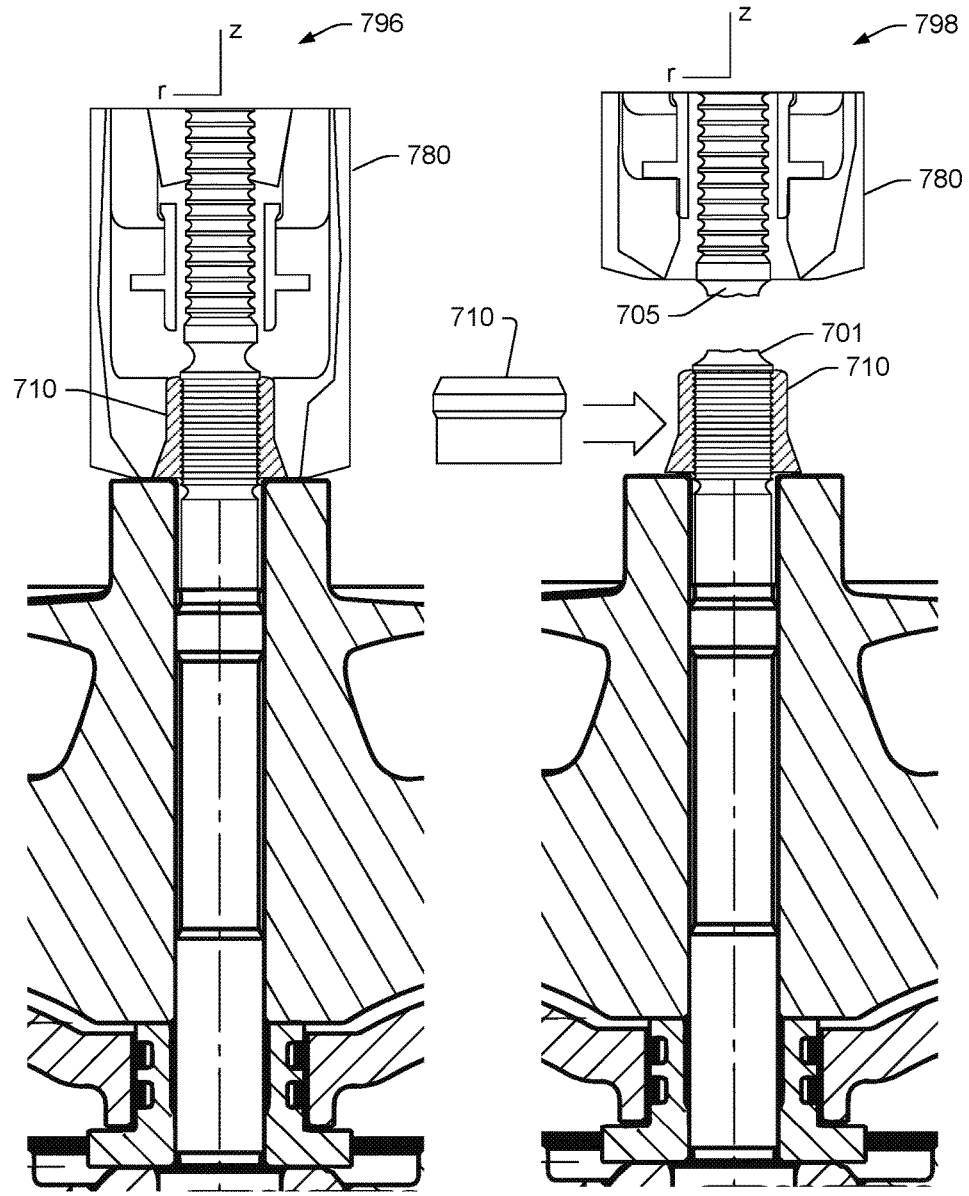

In FIGS. 7A, 7B, 7C and 7D, method actions 792, 794, 796 and 798 are shown, respectively. As shown in FIGS. 7B, 7C and 7D, the actions 794, 796 and 798 include use of a swaging tool 780.

As shown in FIG. 7A, in a swage collar positioning action 792, the swage collar 710 (e.g., in an undeformed stated) is placed on the shaft 700. The swage collar 710 can optionally include internal threads and the turbocharger shaft portion 701 can optionally include external threads such that the swage collar 710 can be threaded onto the turbocharger shaft portion 701. As an example, the swage collar 710 can optionally include internal lock grooves and the turbocharger shaft portion 701 can optionally include external lock features (e.g., grooves, etc.) that can mate with the internal lock grooves of the swage collar 710.

As shown in FIG. 7B, the swage collar 710 is position on the turbocharger shaft portion 701 and, in a tool positioning action 794, the tool 780 is positioned and activated where jaws pull on the assembly grip portion 703 and where the tool 780 pushes on the swage collar 710, for example, for gap removal (e.g., to form contacts).

As shown in FIG. 7C, in a swaging action 796, a nose anvil of the tool 780 acts to swage the swage collar 710 on the turbocharger shaft portion 701. For example, the nose anvil of the tool 780 can cause lock grooves of the swage collar 710 to engage lock grooves on the turbocharger shaft portion 701. In the example of FIG. 7C, continued swaging can cause the swage collar 710 to lengthen and develop into a clamp where the swage collar 710 may be referred to as, for example, a swaged collar.

As shown in FIG. 7D, where swaging of the swage collar 710 onto the turbocharger shaft portion 701 is complete (e.g., at least in part via engagement of features), in a separation action 798, the tool 780 can apply a force or forces that cause separation of the assembly grip portion 705 of the shaft 700 from the turbocharger portion 701 of the shaft 700.

FIG. 7D also shows a shape of the swage collar 710 before and after to illustrate how a swage collar may change in shape responsive to swaging. As mentioned, after swaging, a swage collar may be referred to as a swaged collar.

As an example, a swaged-on collar can form a permanent connection that is relatively immune to vibration. As an example, swaging can be implemented where an applied pre-load remains relatively consistent (e.g., particularly from installation-to-installation).

Figure 8:
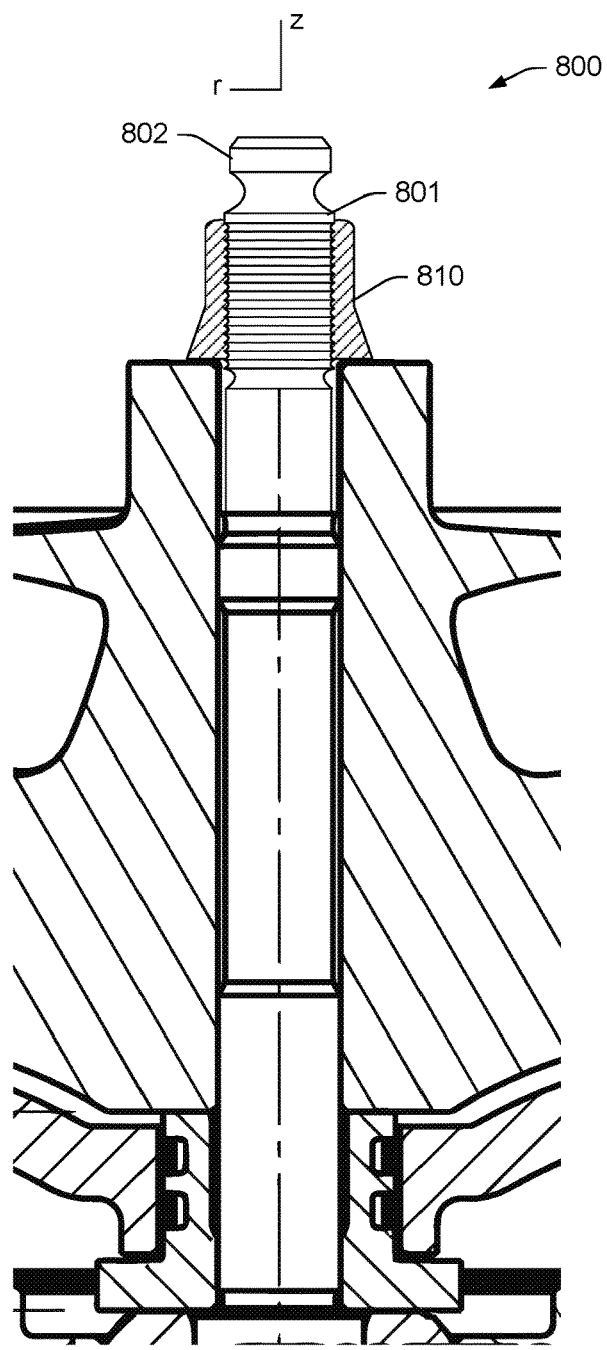
FIG. 8 is a diagram of an example of a compressor wheel assembly.

FIG. 8 shows an example of an assembly 800 where a shaft 801 includes a necked portion 802 over an axial position and where a swaged collar 810 is fit to the shaft 801. As shown, the necked portion 802 can be exposed in a manner that allows for coupling of the shaft 801 to a swaging tool.

Figure 9:
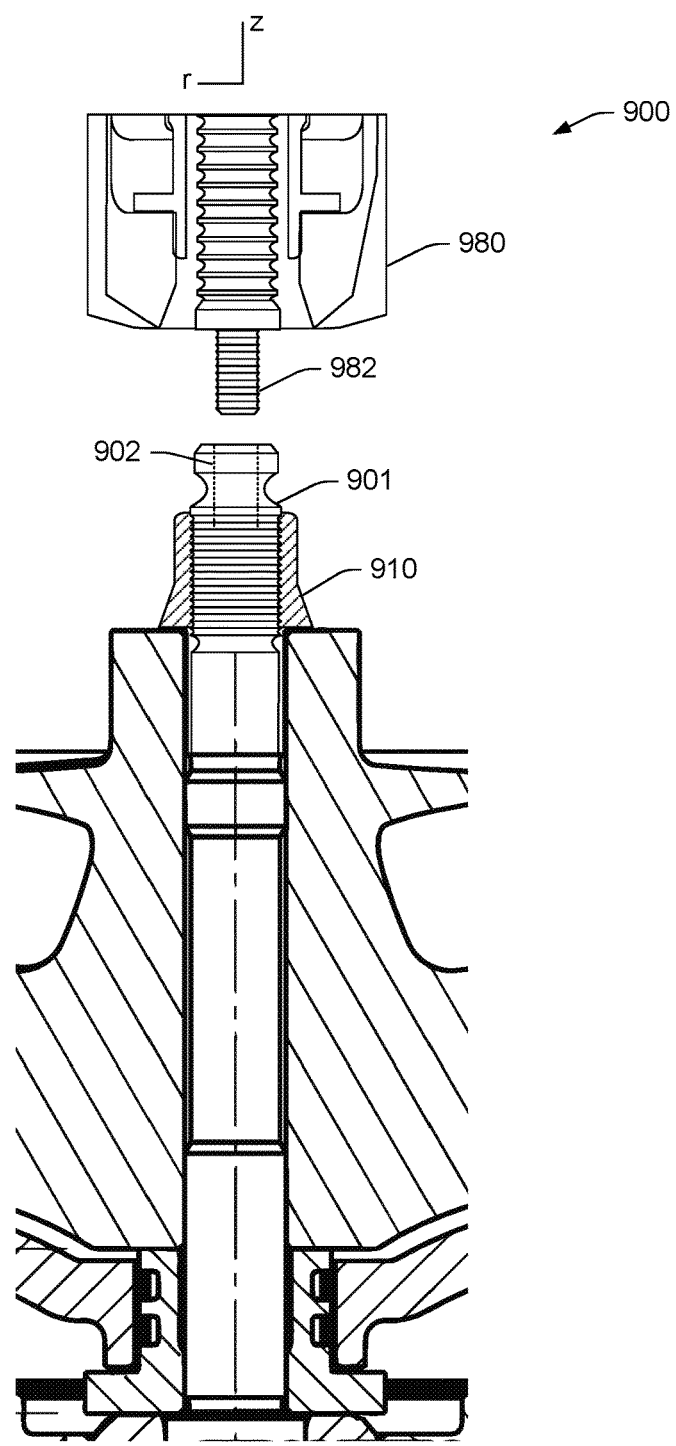
FIG. 9 is a diagram of an example of a compressor wheel assembly.

FIG. 9 shows an example of an assembly 900 where a shaft 901 includes internal threads 902 and where a swaged collar 910 is fit to the shaft 901. As shown, the internal threads 902 may receive external threads 982 of a portion of a swaging tool 980.

Figure 10:
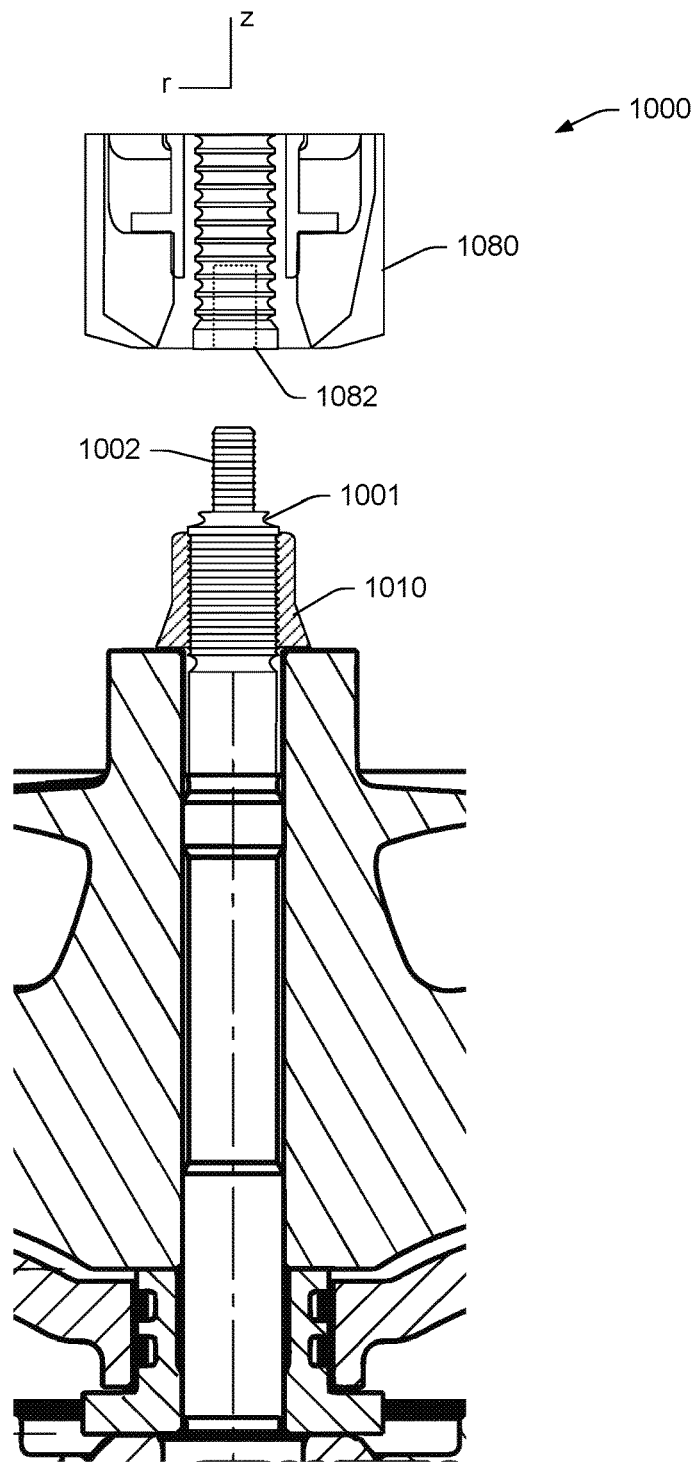
FIG. 10 is a diagram of an example of a compressor wheel assembly.

FIG. 10 shows an example of an assembly 1000 where a shaft 1001 includes external threads 1002 and where a swaged collar 1010 is fit to the shaft 1001. As shown, the external threads 1002 may be received by internal threads 1082 of a portion of a swaging tool 1080.

Figure 11:
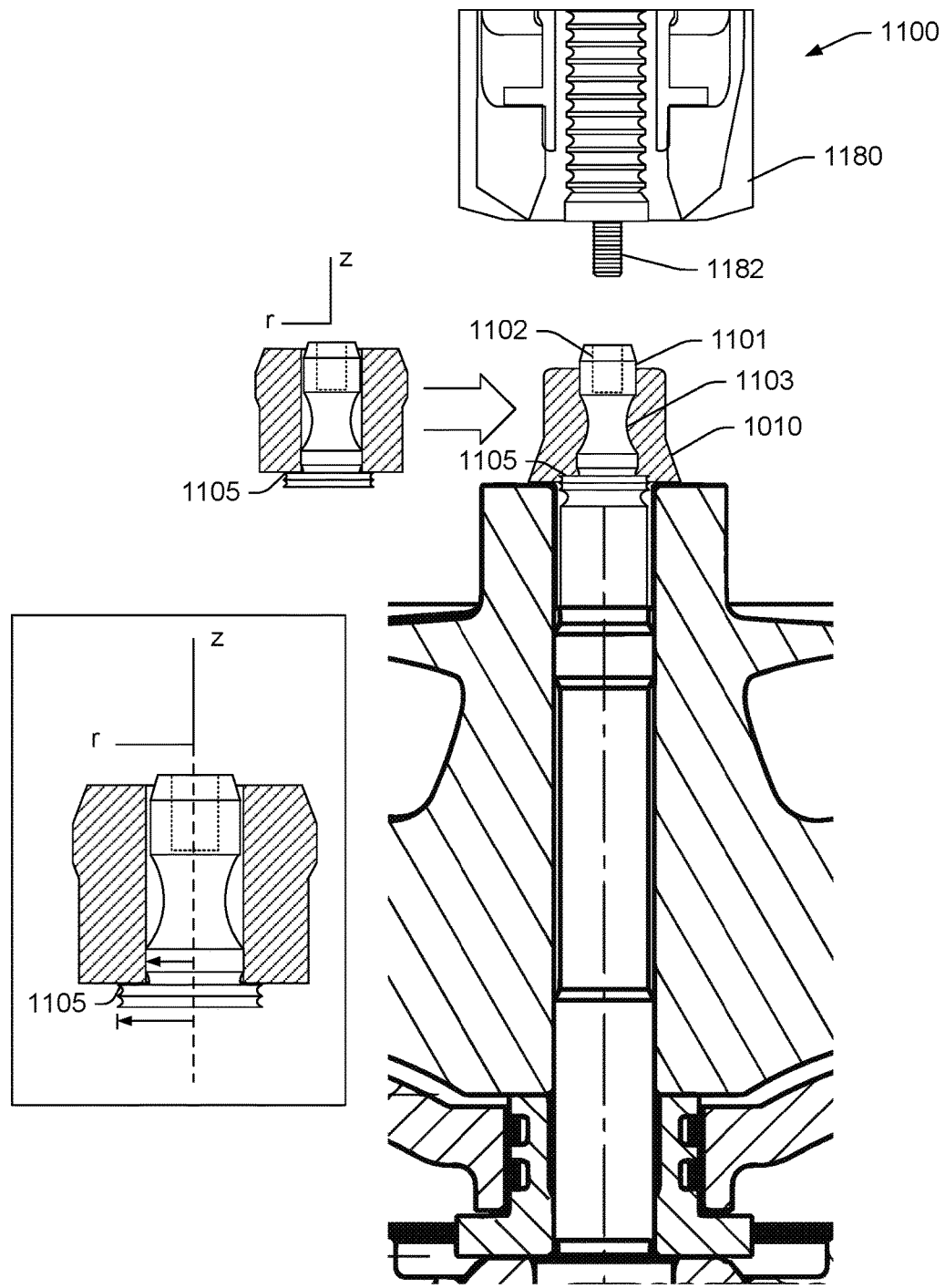
FIG. 11 is a diagram of an example of a compressor wheel assembly.

FIG. 11 shows an example of an assembly 1100 where a shaft 1101 includes a necked portion 1103 and internal threads 1102 and a shoulder 1105 and where a swaged collar 1110 is fit to the shaft 1101. As shown, the internal threads 1102 may receive external threads 1182 of a portion of a swaging tool 1180. In the example of FIG. 11, the swaged collar 1110 is shown as a swage collar in a before swaging state (e.g., an undeformed state, contacting the shoulder 1105) and as the swaged collar 1110 in an after swaging state (e.g., a deformed state).

Figure 12:
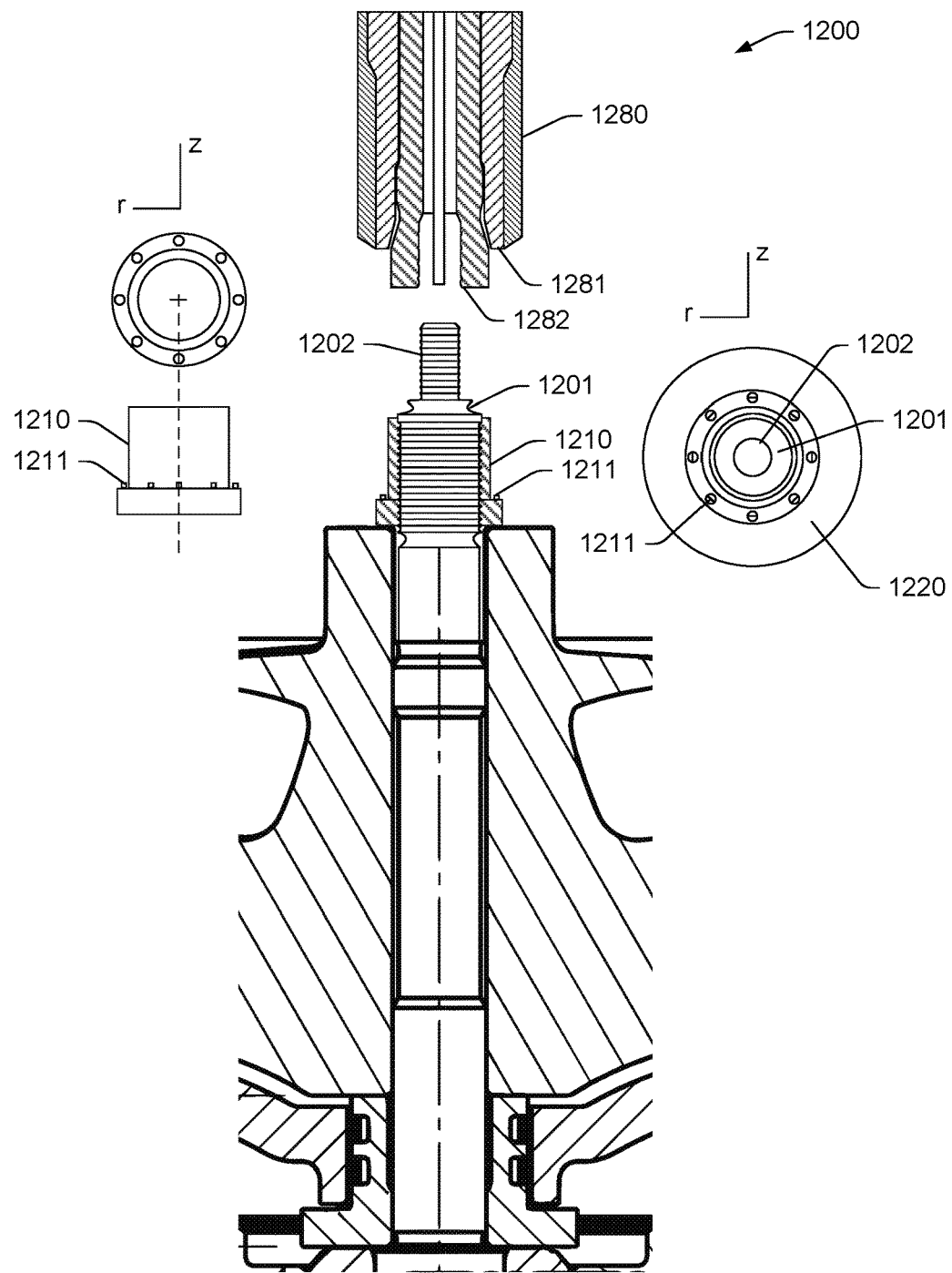
FIG. 12 is a diagram of an example of a compressor wheel assembly.

FIG. 12 shows an example of an assembly 1200 where a shaft 1201 includes an external threads portion 1202 and where a swaged collar 1210 is fit to the shaft 1201 where the swaged collar 1210 includes locators 1211, which can be a plurality of raised locators that extend at least in part axially outwardly. As shown, the external threads 1202 may be received by internal threads 1282 of a portion of a swaging tool 1280. In the example of FIG. 12, the swaging tool 1280 can include a portion 1281 that engages the locators 1211 of the swaged collar 1210 (e.g., as part of a process that includes swaging). In such an example, the portion 1281 may score or otherwise mark the locators 1211 (see, e.g., top view where a portion of a compressor wheel 1220 is visible as well).

As an example, the assembly 1200 and an associated process can include one or more features and/or actions of a bobtail assembly and/or process. For example, a bobtail assembly can include components with locators where locators may be visibly marked during swaging for inspect as to centering quality. As an example, a bobtail assembly can include grooves and ridges to achieve a precise fit between a swaged collar and a shaft where, for example, the swaged collar can include grooves and where the shaft can include ridges or vice versa. As an example, during swaging, grooves and ridges may be brought into contact at least in part via deformation of a collar.

As an example, a threaded nut on a threaded shaft may include gaps such that contact may exist over less than about 40 percent of the threaded surfaces. In such an example, the nut and shaft may be susceptible to vibration forces that can act to loosen the joint. As an example, where a groove and ridge arrangement is utilized, contact may be greater than about 40 percent and thereby form a more vibration resistant joint.

As an example, one or more components may be coated. For example, consider the Magni 565 coating, which is a chrome-free duplex coating that combines an inorganic zinc-rich basecoat with an aluminum-rich organic topcoat. Such a coating system may be relatively resistant to various fuels, fluids, etc. Such a coating can provide for corrosion.

Figure 13:
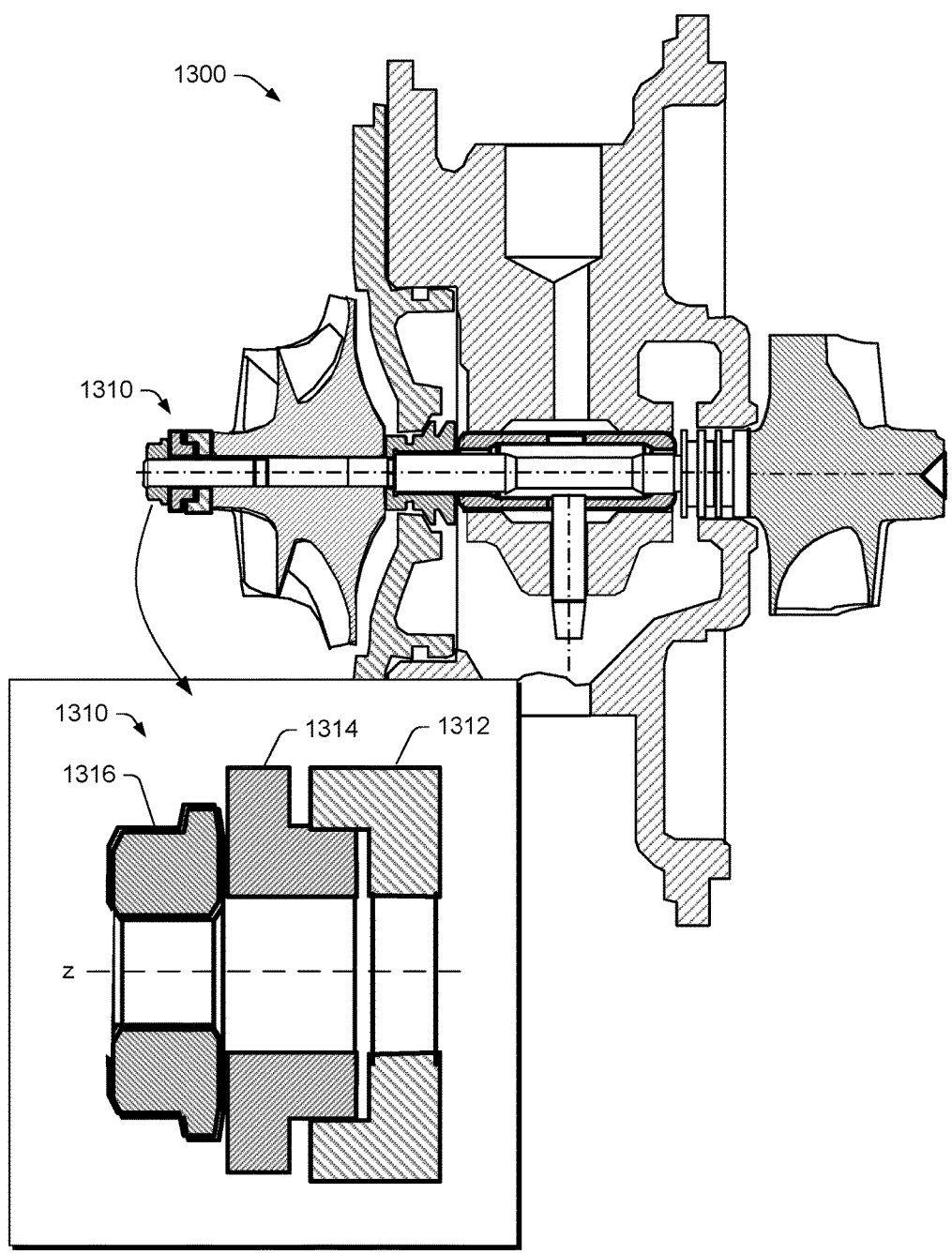
FIG. 13 is a diagram of an example of a compressor wheel assembly that includes a multi-piece collar.

FIG. 13 shows an example of an assembly 1300 (e.g., a CHRA) that includes an interlocking multi-piece collar 1310 that includes a plurality of pieces 1312, 1314 and 1316. In such an example, the pieces may be subjected to swaging as part of a process that can clamp a compressor wheel. In such an example, the pieces 1312, 1314 and 1316 can be substantially symmetrical with respect to a central axis such that co-axial location of the pieces can be achieved. Such a multi-piece collar may aim to co-axially align with respect to an axis of a shaft.

Figure 14:
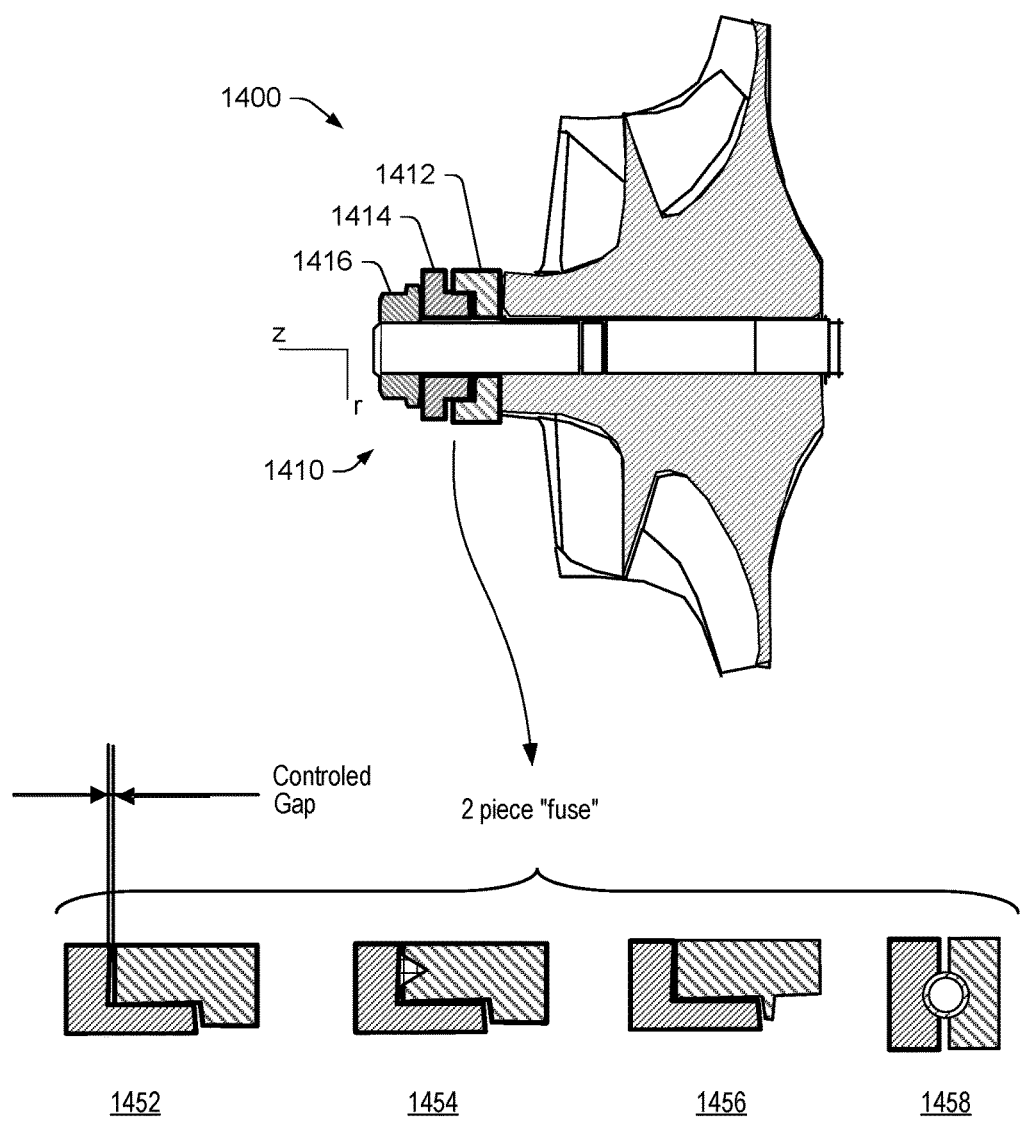
FIG. 14 is a diagram of an example of a compressor wheel assembly that includes a multi-piece collar.

FIG. 14 shows an example of an assembly 1400 that includes an interlocking multi-piece collar 1410 that includes a plurality of pieces 1412, 1414 and 1416. In such an example, the pieces 1412 and 1414 can be "fuse" pieces. For example, such pieces may interact in one or more manners such as illustrated in the scenarios 1452, 1454, 1456 and 1458.

In the example scenario 1452, an interference fit can be tuned to close a gap at a desired amount of force (e.g., about 4000 N+/−500 N, etc.). In the example scenario 1454, a diamond like shaped plastifying element can be included with a counterpart (e.g., counter feature, etc.) that can close a gap at a desired amount of force (e.g., about 4000 N+/−500 N, etc.). In the example scenario 1456, a positive stop may be included with properties (e.g., achieved via shape, etc.) such that it acts via stress to close a gap at a desired amount of force (e.g., about 4000 N+/−500 N, etc.). In the example scenario 1458, a toroidal shaped element (e.g., optionally hollow, etc.) can be formed to have properties such that it can collapse to close a gap at a desired amount of force (e.g., about 4000 N+/−500 N, etc.).

Figure 15:
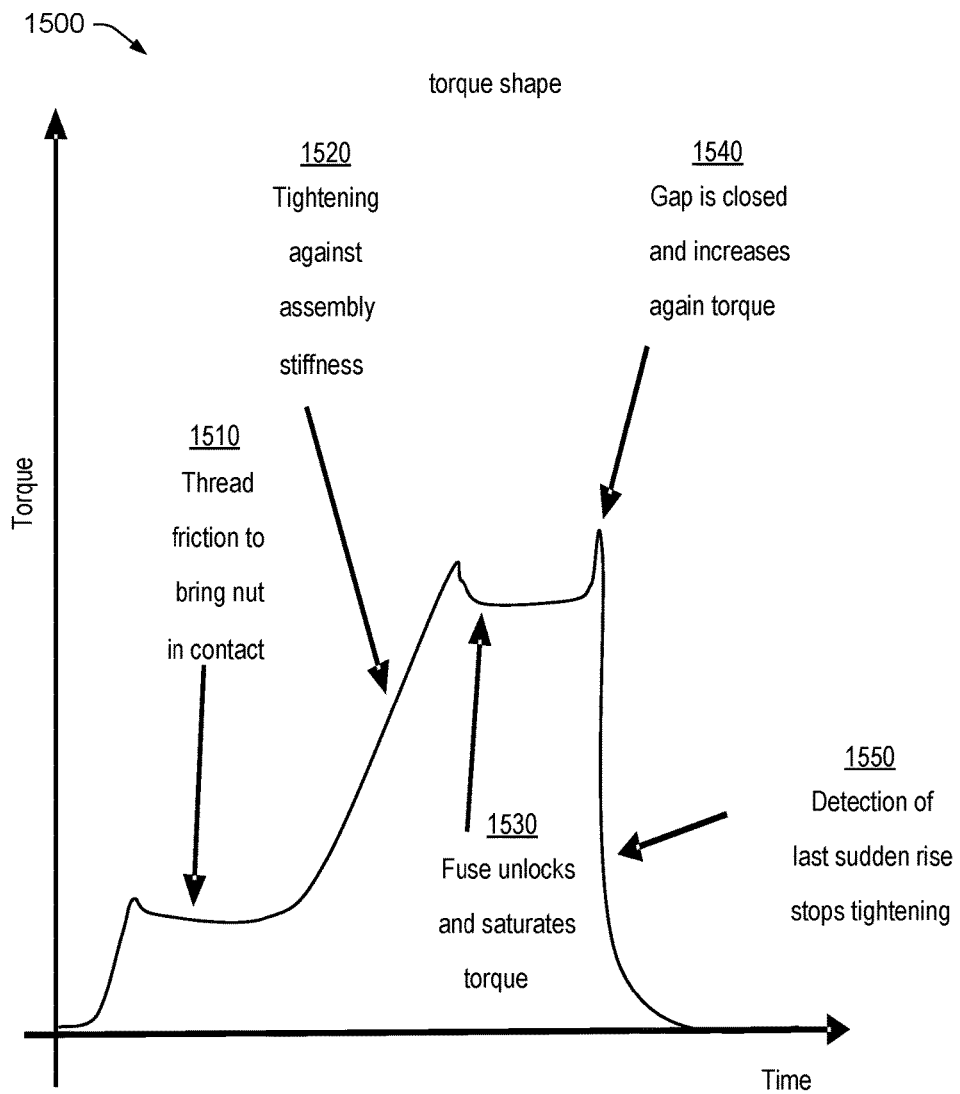
FIG. 15 is a diagram of an example of a plot of torque versus time.

FIG. 15 shows an example of a plot 1500 of torque versus time for a method where thread friction can bring a nut into contact 1510, where tightening against an assembly can achieve stiffness 1520, where a fuse can unlock and saturate torque 1530, where a gap can be closed and torque increase again 1540 and where detection of a last sudden rise can stop tightening 1550. While threads are mentioned, as an example, a non-threaded approach may be utilized where one or more appropriate loads are applied to cause a fuse or fuses to perform one or more associated-load triggered functions.

Figure 16:
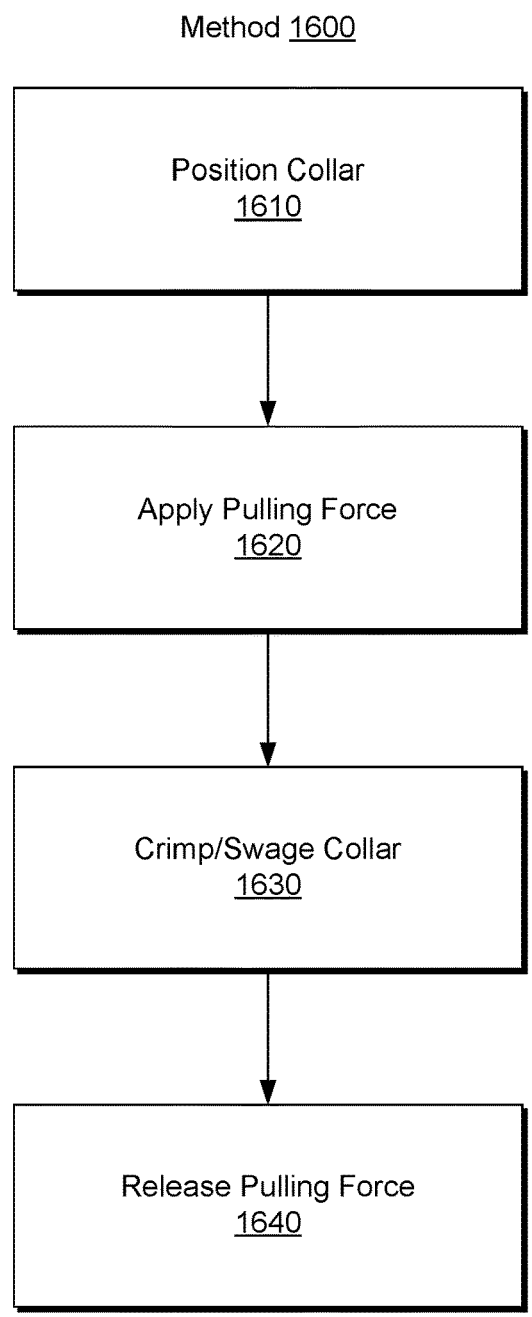
FIG. 16 is a block diagram of an example of a method.

FIG. 16 shows an example of a method 1600 that includes a position block 1610 for positioning a collar, an application block 1620 for applying a pulling force 1620, a crimp block 1630 for crimping (e.g., swaging) the collar and a release block 1640 for releasing the pulling force.

In such an example, the application block 1620 may include applying a pulling force until a desired amount of force is achieved, which may automatically trigger the crimp block 1630 such that the desired amount of force is "locked into" an assembly (e.g., an assembly that includes a compressor wheel and a turbocharger shaft).

As an example, the method 1600 may include applying a force in a range of about 2000 N to about 8000 N. As an example, consider applying a force in a range of about 3000 N to about 6000 N. As an example, consider applying a force in a range of about 4000 N to about 5000 N. As an example, a method can include controlling a force (e.g., a pulling force) to an accuracy that is about 50 N to about 300 N (e.g., plus or minus). As an example, consider a method that includes controlling a force to an accuracy of about +/−150N. Such a method may, in comparison to a method that operates on distance (e.g., a distance in microns) achieve better accuracy and, for example, improve assembly to assembly consistency with respect to a target value.

As an example, a compressor wheel assembly of a turbocharger can include a compressor wheel that includes a through bore that extends from a base portion to a nose portion of the compressor wheel; a turbocharger shaft disposed in the through bore of the compressor wheel where the turbocharger shaft includes an end portion that extends axially away from the nose portion of the compressor wheel; and a swaged collar fixed to the end portion of the turbocharger shaft. In such an example, the swaged collar can include one or more grooves where the end portion of the turbocharger shaft can include one or more features disposed in the one or more grooves where the one or more features contact the swaged collar. As an example, a swaged collar can be a deformed swage collar.

As an example, a swaged collar fixed to an end portion of a turbocharge shaft can include a static applied force of greater than approximately 1000 N. In such an example, the static applied force can correspond to a compression force applied to the compressor (e.g., a compressive force) wheel and can correspond to a tension force applied to the turbocharger shaft (e.g., a tensile force).

As an example, an end portion of a turbocharger shaft can include a neck and an inner surface of a swaged collar can contact the neck.

As an example, an end portion of a turbocharger shaft can include internal threads, external threads or internal threads and external threads. As an example, an end portion of a turbocharger shaft can include internal threads and external features where the external features contact grooves of a swaged collar. As an example, an end portion of a turbocharger shaft can include external threads and external features where the external features contact grooves of a swaged collar.

As an example, a swaged collar can be a multi-piece collar. For example, consider a multi-piece collar that includes at least one mechanical fuse that comprises an associated pre-estimated actuation force; a multi-piece collar that includes a plastic fuse component; a multi-piece collar that includes a deformable fuse feature.

As an example, a compressor wheel assembly of a turbocharger can include a compressor wheel that includes two impeller faces.

As an example, a compressor wheel assembly of a turbocharger can include one or more of a thrust collar; at least one bearing; and a turbine wheel operatively coupled to the turbocharger shaft. As an example, a compressor wheel assembly of a turbocharger may be part of a center housing rotating assembly (CHRA). As an example, a compressor wheel assembly of a turbocharger can include a thrust collar, at least one bearing and a turbine wheel welded to the turbocharger shaft.

As an example, a compressor wheel assembly of a turbocharger can include a thrust collar that abuts a base portion of a compressor wheel and turbocharger shaft that includes a surface that abuts the thrust collar. In such an example, the thrust collar can be at least in part axially disposed between the base portion of the compressor wheel and the surface of the turbocharger shaft. For example, the thrust collar may be clamped between the base portion of the compressor wheel and a shoulder of the turbocharger shaft where the shoulder includes an annular face (e.g., an axial annular face).

As an example, a method of loading a rotating assembly of a turbocharger can include positioning a swage collar on an end portion of a turbocharger shaft that extends through a through bore of a compressor wheel; applying a pulling force to the end portion of the turbocharger shaft to achieve a desired amount of loading; deforming the swage collar to form a swaged collar fixed to the end portion of the turbocharger shaft; and releasing the pulling force where the swaged collar maintains the desired amount of loading. In such an example, the desired amount of loading can exceed a force of approximately 1000 N.

As an example, deforming a swage collar can include forcibly contacting a swaging tool and the swage collar to deform the swage collar.

As an example, a swage collar can include one or more grooves and an end portion of a turbocharger shaft can include one or more features where a method includes deforming that deforms the swage collar to form contacts between the one or more grooves and the one or more features. As an example, a method can include deforming of a swage collar in a manner that forms contacts between one or more grooves and one or more features over at least 40 percent of the one or more grooves and one or more features surfaces (e.g., where such surfaces are of a swaged collar and a shaft).

As an example, a method can include applying a pulling force to an end portion of a turbocharger shaft in a manner that includes applying a pulling force via a threaded coupling of a swaging tool to the end portion of the turbocharger shaft. As an example, a method can include separating a portion of a turbocharger shaft.

As an example, a swage collar or a swaged collar can be a multi-piece collar. For example, a multi-piece collar can include at least one mechanical fuse that comprises an associated pre-estimated actuation force; a multi-piece collar can include a plastic fuse component; a multi-piece collar can include a deformable fuse feature; etc. As an example, a desired amount of loading can trigger deforming of at least one piece of a multi-piece collar.

As an example, a method can include applying a desired amount of loading where the desired amount of loading triggers deforming a swage collar to, for example, form a deformed swage collar that can "lock-in" (e.g., maintain) the desired amount of loading.

As an example, a method can include measuring loading (e.g., via one or more load cells, etc.). As an example, a method can include receiving a signal or signals via a load cell and controlling application of force based at least in part on such signal or signal.

As an example, a method can include utilizing a turbocharger shaft that includes a shoulder that experiences force by applying a pulling force to an end portion of the turbocharger shaft. In such an example, the shoulder can be an axial annular face or of another shape and the shoulder may abut a thrust collar that is positioned at least in part between the shoulder and a base end of a compressor wheel, which, for example, for a two impeller face compressor wheel may be a nose of an inwardly facing compressor wheel.

As an example, a method can include positioning a thrust collar that abuts a compressor wheel at a base end of the compressor wheel where a turbocharger shaft includes a surface that abuts the thrust collar, and where the method includes applying and/or maintaining a desired amount of loading where such loading is applied and/or maintained axially between a swaged collar and the surface of the turbocharger shaft, which may be, for example, an axial face (e.g., an annular face, etc.).

As an example, a computer can include a processor and memory as well as instructions stored in the memory where the instructions are executable by the processor to instruct the computer to perform a crimping method that can lock-in a desired amount of load in a center housing rotating assembly of a turbocharger. In such an example, the computer can include one or more interfaces that can be operatively coupled to equipment such as one or more force applicators and/or one or more sensors. As an example, a force applicator can be a force applicator for applying a load and/or a force applicator for crimping a swage collar to deform the swage collar (e.g., single or multi-piece) to form a swaged collar that is fixed to a turbocharger shaft.

As an example, a method can include measuring applied force (e.g., as applied via a force applicator or force applicators). As an example, a method can include balancing a rotating assembly by removing material from a swaged collar. As an example, a method can include balancing a rotating assembly by removing material from the compressor wheel, for example, without removing material from the swaged collar.

Although some examples of methods, devices, systems, arrangements, etc., have been illustrated in the accompanying Drawings and described in the foregoing Detailed Description, it will be understood that the example embodiments disclosed are not limiting, but are capable of numerous rearrangements, modifications and substitutions.

What is claimed is:

1. A compressor wheel assembly of a turbocharger comprising:
   a compressor wheel that comprises a through bore that extends from a base portion to a nose portion of the compressor wheel;
   a turbocharger shaft disposed in the through bore of the compressor wheel wherein the turbocharger shaft comprises an end portion that extends axially away from the nose portion of the compressor wheel, wherein the end portion comprises a neck and a shoulder; and
   a swaged collar fixed to the end portion of the turbocharger shaft, wherein an inner surface of the swaged collar contacts the neck and the shoulder of the end portion of the shaft and wherein, in an undeformed state of the swaged collar, an inner radius of a bore of the swaged collar is less than an outer radius of the shoulder of the shaft.

2. The compressor wheel assembly of a turbocharger of claim 1 wherein the swaged collar comprises a deformed swage collar.

3. The compressor wheel assembly of a turbocharger of claim 1 wherein the swaged collar fixed to the end portion of the turbocharger shaft comprises a static applied force of greater than approximately 1000 N.

4. The compressor wheel assembly of a turbocharger of claim 3 wherein the static applied force corresponds to a compression force applied to the compressor wheel and corresponds to a tension force applied to the turbocharger shaft.

5. The compressor wheel assembly of a turbocharger of claim 1 wherein the end portion comprises internal threads, external threads or internal threads and external threads.

6. The compressor wheel assembly of a turbocharger of claim 1 wherein the end portion comprises internal threads and external features wherein the external features contact grooves of the swaged collar.

7. The compressor wheel assembly of a turbocharger of claim 1 wherein the swaged collar comprises a multi-piece collar.

8. The compressor wheel assembly of a turbocharger of claim 1 wherein the compressor wheel comprises two impeller faces.

9. The compressor wheel assembly of a turbocharger of claim 1 comprising a thrust collar.

10. The compressor wheel assembly of a turbocharger of claim 1 comprising at least one bearing.

11. The compressor wheel assembly of a turbocharger of claim 1 comprising a turbine wheel operatively coupled to the turbocharger shaft.

12. The compressor wheel assembly of a turbocharger of claim 1 comprising a thrust collar, at least one bearing and a turbine wheel welded to the turbocharger shaft.

13. The compressor wheel assembly of a turbocharger of claim 1 comprising a thrust collar that abuts the base portion of the compressor wheel and wherein the turbocharger shaft comprises a surface that abuts the thrust collar.

14. The compressor wheel assembly of claim 13 wherein the thrust collar is at least in part axially disposed between the base portion of the compressor wheel and the surface of the turbocharger shaft.

15. A compressor wheel assembly of a turbocharger comprising:
    a compressor wheel that comprises a through bore that extends from a base portion to a nose portion of the compressor wheel;
    a turbocharger shaft disposed in the through bore of the compressor wheel wherein the turbocharger shaft comprises an end portion that extends axially away from the nose portion of the compressor wheel; and
    a swaged collar fixed to the end portion of the turbocharger shaft, wherein the end portion comprises internal threads and external features wherein the external features contact grooves of the swaged collar.

16. A compressor wheel assembly of a turbocharger comprising:
    a compressor wheel that comprises a through bore that extends from a base portion to a nose portion of the compressor wheel;
    a turbocharger shaft disposed in the through bore of the compressor wheel wherein the turbocharger shaft comprises an end portion that extends axially away from the nose portion of the compressor wheel; and
    a swaged collar fixed to the end portion of the turbocharger shaft, wherein the swaged collar comprises a multi-piece collar that comprises at least one fuse piece disposed between two other pieces of the multi-piece collar.

17. The compressor wheel assembly of a turbocharger of claim 16 wherein the at least one fuse piece comprises at least one mechanical fuse that comprises an associated pre-estimated actuation force.

18. The compressor wheel assembly of a turbocharger of claim 16 wherein the at least one fuse piece comprises at least one plastic fuse piece.

* * * * *